US012788662B2

(12) United States Patent
Dan et al.

(10) Patent No.: US 12,788,662 B2
(45) Date of Patent: Nov. 10, 2026

(54) DEVICE FOR ASSISTING WITH EXTENSION AND/OR FLEXION OF THE KNEE JOINT

(71) Applicant: ERMI LLC, Atlanta, GA (US)

(72) Inventors: Matei Dan, Atlanta, GA (US); Thomas P. Branch, Atlanta, GA (US); Shaun Kevin Stinton, Chamblee, GA (US); Edward Dittmar, Marietta, GA (US)

(73) Assignee: ERMI LLC, Atlanta, GA (US)

( * ) Notice: Subject to any disclaimer, the term of this patent is extended or adjusted under 35 U.S.C. 154(b) by 886 days.

(21) Appl. No.: 18/023,996

(22) PCT Filed: Aug. 31, 2021

(86) PCT No.: PCT/US2021/048482
§ 371 (c)(1),
(2) Date: Feb. 28, 2023

(87) PCT Pub. No.: WO2022/047398
PCT Pub. Date: Mar. 3, 2022

(65) Prior Publication Data

US 2023/0270613 A1 Aug. 31, 2023

Related U.S. Application Data

(60) Provisional application No. 63/072,880, filed on Aug. 31, 2020.

(51) Int. Cl.
*A61H 1/02* (2006.01)

(52) U.S. Cl.
CPC ..... *A61H 1/024* (2013.01); *A61H 2201/0149* (2013.01); *A61H 2201/123* (2013.01);
(Continued)

(58) Field of Classification Search
CPC ............ A61H 1/024; A61H 2201/0149; A61H 2201/123; A61H 2201/1246;
(Continued)

(56) References Cited

U.S. PATENT DOCUMENTS 4,222,376 A * 9/1980 Praprotnik ........... A61H 1/0214 601/24
4,229,001 A * 10/1980 Roman .............. A63B 23/0482 482/79

(Continued)

OTHER PUBLICATIONS

Patent Cooperation Treaty; Written Opinion and International Search Report, Dec. 6, 2021, cited in Application No. PCT/US21/48482, 11 pages.

*Primary Examiner* — Valerie L Woodward
(74) *Attorney, Agent, or Firm* — Shumaker, Loop & Kendrick, LLP; Patrick B. Horne

(57) ABSTRACT

A device performs a flexion process or an extension process with respect to a knee joint. The device includes a support frame extending in a longitudinal direction. A flexion system includes a foot support assembly configured to translate relative to the support frame in the longitudinal direction thereof and a flexion linear actuator configured to cause the translation of the foot support assembly. The extension system an extension pad assembly including a first expansion pad configured to engage an upper surface of the leg at a position above the knee joint and a second expansion pad configured to engage the upper surface of the leg at a position below the knee joint. An extension linear actuator is configured to translate the extension pad assembly with respect to the transverse direction. A power system is configured to selectively actuate each of the flexion linear actuator and the extension linear actuator.

21 Claims, 16 Drawing Sheets

(52) U.S. Cl.
CPC ................ *A61H 2201/1246* (2013.01); *A61H 2201/1642* (2013.01); *A61H 2201/1676* (2013.01); *A61H 2203/0437* (2013.01)

(58) Field of Classification Search
CPC .... A61H 2201/1642; A61H 2201/1676; A61H 2201/0107; A61H 2201/164; A61H 2201/1664; A61H 2203/0437; A61H 2001/0207; A61H 2001/0211; A61H 2001/0237; A61H 2001/0255; A61H 2001/0259; A61H 2001/0262
See application file for complete search history.

(56) References Cited

U.S. PATENT DOCUMENTS 4,665,899 A * 5/1987 Farris .................. A61H 1/0259 601/33
6,872,186 B2 * 3/2005 Branch ................ A61H 1/0259 482/130
2007/0093729 A1 * 4/2007 Ewing .................... A61H 1/024 601/5
2007/0161479 A1 * 7/2007 Harris .............. A63B 21/00072 482/148
2008/0096744 A1 * 4/2008 Perry, Jr. .............. A61H 1/0218 482/142
2009/0093353 A1 * 4/2009 Weiner ................... A61H 1/024 482/130
2010/0270771 A1 * 10/2010 Kobayashi ............... A61H 3/04 280/210
2014/0094721 A1 * 4/2014 Diallo ................ A63B 24/0087 601/5
2014/0276273 A1 * 9/2014 Leismer ............. A63B 23/0405 601/49
2018/0256433 A1 * 9/2018 Pucci ..................... A61H 1/024

* cited by examiner

DEVICE FOR ASSISTING WITH EXTENSION AND/OR FLEXION OF THE KNEE JOINT

CROSS-REFERENCE TO RELATED APPLICATIONS

This application is a Patent Cooperation Treaty (PCT) application tracing priority to U.S. Provisional Application No. 63/072,880, filed Aug. 31, 2020, entitled “DEVICE FOR ASSISTING WITH EXTENSION AND/OR FLEXION OF THE KNEE JOINT”, the entirety of which is expressly incorporated herein by reference.

FIELD OF THE INVENTION

The present invention is generally directed to orthotic devices, and more particularly, to orthotic devices designed to improve and promote gains in range of motion in a knee joint by use of hydraulic, pneumatic, electric, electro-mechanical, and/or mechanical lever systems.

BACKGROUND

Injuries and/or surgical interventions with respect to a joint typically lead to a loss of a range of motion of the joint. This loss of range of motion is often caused by the excess production of fibrous (scar) tissue within the joint following the injury or the surgical procedure. One joint that commonly suffers from such a loss of range of motion is the knee joint. The knee joint may not be able to bend (flex) to the necessary degree, straighten (extend) to the necessary degree, or a combination of the two.

The limited range of motion of the knee joint can be overcome by progressively stretching the knee joint towards the full and normal end range of motion. Such stretching may occur over numerous distinct sessions wherein the knee joint is progressively flexed and/or extended to a further degree, depending on the needs of the individual patient. For example, if a flexion process is required, the knee joint may be progressively flexed by moving the foot of the patient towards the buttocks of the patient to increase the angle present between the lower leg and the upper leg of the patient as separated by the knee joint. Each session may include applying a force to a foot of the patient in a direction towards the buttocks of the patient when the patient is in a seated position. As another example, if an extension process is required, the knee joint may be progressively extended by applying a force at or adjacent the knee joint in a manner causing the upper leg and the lower leg of the patient to move closer to a parallel arrangement with the foot of the patient moving away from the buttocks while the patient is in the seated position. The flexion and the extension processes accordingly require contrary movements of the corresponding knee joint and the application of different forces to the knee joint.

The flexion and extension process have traditionally been addressed by independently provided orthotic devices that utilize different configurations, power sources, methods of manipulation, and the like. The use of these separate devices can lead to the need for additional storage space, movement of the patient between the flexion and extension sessions, additional time setting up the contrary device configurations, and additional expense in procuring the distinct devices.

There is accordingly a need to produce an orthotic device that can address the lack of range of motion of the knee joint with respect to each of the flexion process and the extension process that includes a simplified construction, an ease of use, and reduced space consumption during both use and storage thereof.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing a device for manipulating a leg of a user, the device configured to perform either of a flexion process or an extension process with respect to a knee joint of the user. The device comprises a support frame extending in a longitudinal direction from a first end to a second end, a flexion system, an extension system, and a fluid power system. The flexion system comprises a foot support assembly configured to translate relative to the support frame in the longitudinal direction thereof, the foot support assembly configured to engage a foot of the user during a flexion process of the device or an ankle of the user during an extension process of the device. The flexion system also comprises a flexion linear actuator configured to selectively cause the translation of the foot support assembly with respect to the longitudinal direction of the support frame during the flexion process. The extension system comprises a column assembly extending from the support frame in a transverse direction arranged transverse to the longitudinal direction thereof, the column assembly including a first component coupled to the support frame and a second component configured to translate relative to the first component with respect to the transverse direction. The extension system also comprises an extension pad assembly coupled to the second component of the column assembly, the extension pad assembly including a first expansion pad configured to engage an upper surface of the leg at a position above the knee joint and a second expansion pad configured to engage the upper surface of the leg at a position below the knee joint during the extension process of the device. The extension system also comprises an extension linear actuator configured to selectively cause the translation of the second component having the extension pad assembly with respect to the transverse direction during the extension process. The power system is configured to selectively actuate each of the flexion linear actuator and the extension linear actuator.

According to another embodiment of the invention, the first end of the support frame is mounted to a seating structure and the second end of the support frame rests on a floor surface.

According to another embodiment of the invention, the first end of the support frame includes a mounting assembly for removably mounting the support frame to the seating structure.

According to another embodiment of the invention, the mounting assembly includes a bracket having a slot configured to receive a cross member of the seating structure.

According to another embodiment of the invention, the support frame is inclined relative to the floor surface with the first end thereof elevated relative to the second end thereof.

According to another embodiment of the invention, the support frame includes a position indicator extending in the longitudinal direction of the support frame.

According to another embodiment of the invention, the support frame includes a rail structure configured to slidably engage a foot support carriage of the foot support assembly.

According to another embodiment of the invention, the rail structure includes openings and the foot support carriage includes projections received within the openings.

According to another embodiment of the invention, the extension system is configured to translate relative to the support frame with respect to the longitudinal direction thereof to position the extension pad assembly adjacent the knee joint.

According to another embodiment of the invention, the extension system is slidably coupled to a rail structure of the support frame.

According to another embodiment of the invention, the rail structure is slidably coupled to the extension system at a lateral side surface of the support frame.

According to another embodiment of the invention, the rail structure slidably engages an extension carriage of the extension system.

According to another embodiment of the invention, the rail structure includes openings and the extension carriage includes projections received within the openings.

According to another embodiment of the invention, the extension carriage is coupled to the first component of the column assembly.

According to another embodiment of the invention, the extension carriage is rotatably coupled to the first component of the column assembly, wherein the column assembly is configured to rotate relative to the frame support about a rotational axis arranged perpendicular to the longitudinal direction thereof to prevent the extension system from obstructing the user during the flexion process.

According to another embodiment of the invention, the rotational axis is arranged one of parallel to the transverse direction or perpendicular to the transverse direction.

According to another embodiment of the invention, a position locking feature affixes a position of the extension system relative to the support frame with respect to the longitudinal direction during the extension process.

According to another embodiment of the invention, the position locking feature is a clamping mechanism configured to clamp the extension system to the support frame.

According to another embodiment of the invention, the foot support assembly includes a foot support carriage slidably coupled to the support frame and a foot plate rotatably coupled to the foot support carriage.

According to another embodiment of the invention, the foot support assembly further includes an inclination adjustment assembly configured to adjust an inclination of the foot support relative to the longitudinal direction of the support frame.

According to another embodiment of the invention, the inclination adjustment assembly includes a positioning pin extending from the foot support carriage and an adjustment plate rotatably coupled to the foot plate, the adjustment plate including a slot formed therein for receiving the positioning pin, wherein the inclination of the foot plate corresponds to a position of the positioning pin within the slot.

According to another embodiment of the invention, the slot is L-shaped in configuration and extends to an outer edge of the adjustment plate.

According to another embodiment of the invention, the positioning pin is configured to be removable from the slot of the adjustment plate to collapse the foot plate to an orientation substantially parallel to a longitudinal direction of the foot support carriage.

According to another embodiment of the invention, the foot support assembly includes a foot plate and an ankle support structure, the foot plate including a foot support surface configured to receive a bottom of a foot of the user thereon during the flexion process and the ankle support structure including an ankle support surface configured to receive an ankle of the user thereon during the extension process.

According to another embodiment of the invention, the ankle support structure is configured to be rotatable between a first position wherein the ankle support structure rests on the foot support surface of the foot plate and a second position wherein the ankle support structure is not disposed on the foot support surface.

According to another embodiment of the invention, the ankle support surface is arranged at an incline relative to a foot support surface when the ankle support structure is in the first position.

According to another embodiment of the invention, the first position of the ankle support structure corresponds to the extension process of the device and the second position of the ankle support structure corresponds to the flexion process of the device.

According to another embodiment of the invention, the ankle support structure is hingedly coupled to an end of the foot plate.

According to another embodiment of the invention, the ankle support surface is concave in shape.

According to another embodiment of the invention, the ankle support structure is configured to receive a removable pad thereon, the removable pad forming the ankle support surface.

According to another embodiment of the invention, the flexion linear actuator is a hydraulic cylinder powered by a hydraulic fluid, a pneumatic cylinder powered by pressurized air, or an electro-mechanical system such as a motorized and/or geared system.

According to another embodiment of the invention, the hydraulic cylinder is mounted to the support frame and includes a piston having a piston rod coupled to the foot support assembly.

According to another embodiment of the invention, the extension linear actuator is a hydraulic cylinder powered by a hydraulic fluid, a pneumatic cylinder powered by pressurized air, or an electro-mechanical system such as a motorized and/or geared system.

According to another embodiment of the invention, the hydraulic cylinder is mounted to the first component and includes a piston having a piston rod coupled to the second component.

According to another embodiment of the invention, a common hydraulic fluid of the fluid power system is configured to be selectively communicated to each of the flexion linear actuator and the extension linear actuator.

According to another embodiment of the invention, the fluid power system is powered by a hand pump lever actuated by the user.

According to another embodiment of the invention, the fluid power system includes a mode adjustment switch configured to control which of the flexion linear actuator or the extension linear actuator is instantaneously powered by the fluid power system.

According to another embodiment of the invention, the fluid power system includes a stroke adjustment switch configured to control a direction of actuation of either of the flexion linear actuator or the extension linear actuator depending on the position of the mode adjustment switch.

According to another embodiment of the invention, the extension pad assembly includes a swivel bar having the first and second extension pads coupled to opposing ends thereof.

According to another embodiment of the invention, the swivel bar rotates about an axis of rotation arranged perpendicular to the transverse direction.

According to another embodiment of the invention, the axis of rotation of the swivel bar is also arranged perpendicular to the longitudinal direction of the support frame.

According to another embodiment of the invention, each of the first extension pad and the second extension pad includes a circumferentially extending concave surface.

According to another embodiment of the invention, the extension pad assembly includes a position locking feature for locking a position of the extension pad assembly on the second component with respect to the transverse direction.

According to another embodiment of the invention, the position locking feature is a clamping sleeve configured to selectively clamp around the second component.

According to another embodiment of the invention, the first component is an inner tube and the second component is an outer tube, the outer tube telescoping relative to the inner tube.

According to another embodiment of the invention, a toggle mechanism is configured to change a position of the extension system relative to the support frame during the flexion process or storage of the device.

According to another embodiment of the invention, the toggle mechanism rotates the extension system about an axis arranged perpendicular to the longitudinal direction of the support frame.

According to another embodiment of the invention, the device is configured to perform either of a flexion process or an extension process with respect to a knee joint of the user. The device comprises a flexion system for carrying out the flexion process. The flexion system includes a flexion linear actuator configured to selectively actuate in a first direction and a second direction. The device also comprises an extension system for carrying out the extension process. The extension system includes an extension linear actuator configured to selectively actuate in a first direction and a second direction. A fluid power system is configured to selectively actuate each of the flexion linear actuator and the extension linear actuator.

According to another embodiment of the invention, each of the flexion linear actuator and the extension linear actuator is a hydraulic cylinder, wherein a common hydraulic fluid of the fluid power system is configured to be selectively communicated to each of the flexion linear actuator and the extension linear actuator.

According to another embodiment of the invention, the fluid power system is powered by a hand pump lever actuated by the user.

According to another embodiment of the invention, the fluid power system includes a mode adjustment switch configured to control which of the flexion linear actuator or the extension linear actuator is instantaneously powered by the fluid power system.

According to another embodiment of the invention, the fluid power system includes a stroke adjustment switch configured to control a direction of actuation of either of the flexion linear actuator or the extension linear actuator depending on the position of the mode adjustment switch.

According to another embodiment of the invention, the device is configured to perform either of a flexion process or an extension process with respect to a knee joint of the user. The device comprises a flexion system for carrying out the flexion process, an extension system for carrying out the extension process, and a foot support assembly for use with each of the flexion system and the extension system. The foot support assembly includes a foot plate and an ankle support structure. The foot plate includes a foot support surface configured to receive a bottom of a foot of the user thereon during the flexion process and the ankle support structure includes an ankle support surface configured to receive an ankle of the user thereon during the extension process. The ankle support structure is configured to be rotatable between a first position wherein the ankle support structure rests on the foot support surface of the foot plate and a second position wherein the ankle support structure is not disposed on the foot support surface.

According to another embodiment of the invention, the ankle support surface is arranged at an incline relative to a foot support surface when the ankle support structure is in the first position.

According to another embodiment of the invention, the first position of the ankle support structure corresponds to the extension process of the device and the second position of the ankle support structure corresponds to the flexion process of the device.

According to another embodiment of the invention, the ankle support surface is concave in shape.

According to another embodiment of the invention, the ankle support structure is configured to receive a removable pad thereon, the removable pad forming the ankle support surface.

According to another embodiment of the invention, the removable pad includes a concave surface forming the ankle support surface.

According to another embodiment of the invention, the ankle support structure is hingedly coupled to an end of the foot plate.

According to another embodiment of the invention, the ankle support structure is hingedly coupled to a first end of the foot plate and an inclination adjustment assembly is coupled to a second end of the foot plate, the inclination adjustment assembly configured to adjust an inclination of the foot support relative to the longitudinal direction of the support frame.

According to another embodiment of the invention, the inclination adjustment assembly includes a positioning pin and an adjustment plate rotatably coupled to the second end of the foot plate, the adjustment plate including a slot formed therein for receiving the positioning pin, wherein the inclination of the foot plate corresponds to a position of the positioning pin within the slot.

According to another embodiment of the invention, the slot is L-shaped in configuration and extends to an outer edge of the adjustment plate.

According to another embodiment of the invention, the positioning pin is configured to be removable from the slot of the adjustment plate to collapse the foot plate to an orientation substantially perpendicular to the longitudinal direction of the support frame According to another embodiment of the invention, the device is configured to perform an extension process with respect to a knee joint of the user. The device comprises a column assembly including a stationary first component and a second component configured to translate relative to the first component with respect to a longitudinal direction of the column assembly. An extension pad assembly is coupled to the second component of the column assembly. The extension pad assembly includes a first expansion pad configured to engage an upper surface of the leg at a position above the knee joint and a second expansion pad configured to engage the upper surface of the leg at a position below the knee joint during the extension process of the device. The extension pad assembly includes a swivel bar having the first and second extension pads coupled to opposing ends thereof. The swivel bar rotates about an axis of rotation arranged perpendicular to the longitudinal direction of the column assembly. An extension linear actuator is configured to selectively cause the translation of the second component having the extension pad assembly with respect to the longitudinal direction of the column assembly during the extension process.

According to another embodiment of the invention, the column assembly is configured to be translatable relative to a direction of extension of the leg of the user during the extension process.

According to another embodiment of the invention, each of the first extension pad and the second extension pad includes a circumferentially extending concave surface configured to extend around an upper disposed portion of the leg of the user during the extension process.

According to another embodiment of the invention, the extension pad assembly includes a position locking feature for locking a position of the extension pad assembly to the second component with respect to the longitudinal direction of the column assembly.

According to another embodiment of the invention, the position locking feature is a clamping sleeve configured to selectively clamp around the second component.

According to another embodiment of the invention, a method for manipulating a leg of a user, thereby providing extension or flexion assistance to the leg of the user about a knee joint of the user, is disclosed. The method comprises the steps of engaging one of a foot of the user with a foot support assembly with respect to a flexion process or a knee joint of the user with an extension pad assembly with respect to an extension process; and activating a force application mechanism to apply an incremental force to one of the foot support assembly with respect to the flexion process or the extension pad assembly with respect to the extension process, wherein the applied incremental force causes one of the foot of the user to move towards a buttocks of the user to cause flexion of the leg of the user with respect to the flexion process or the knee joint of the user to move downwardly to cause extension of the leg with respect to the extension process.

According to another embodiment of the invention, the step of activating the force application mechanism further comprises the step of the user moving a lever for providing power to the force application mechanism.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
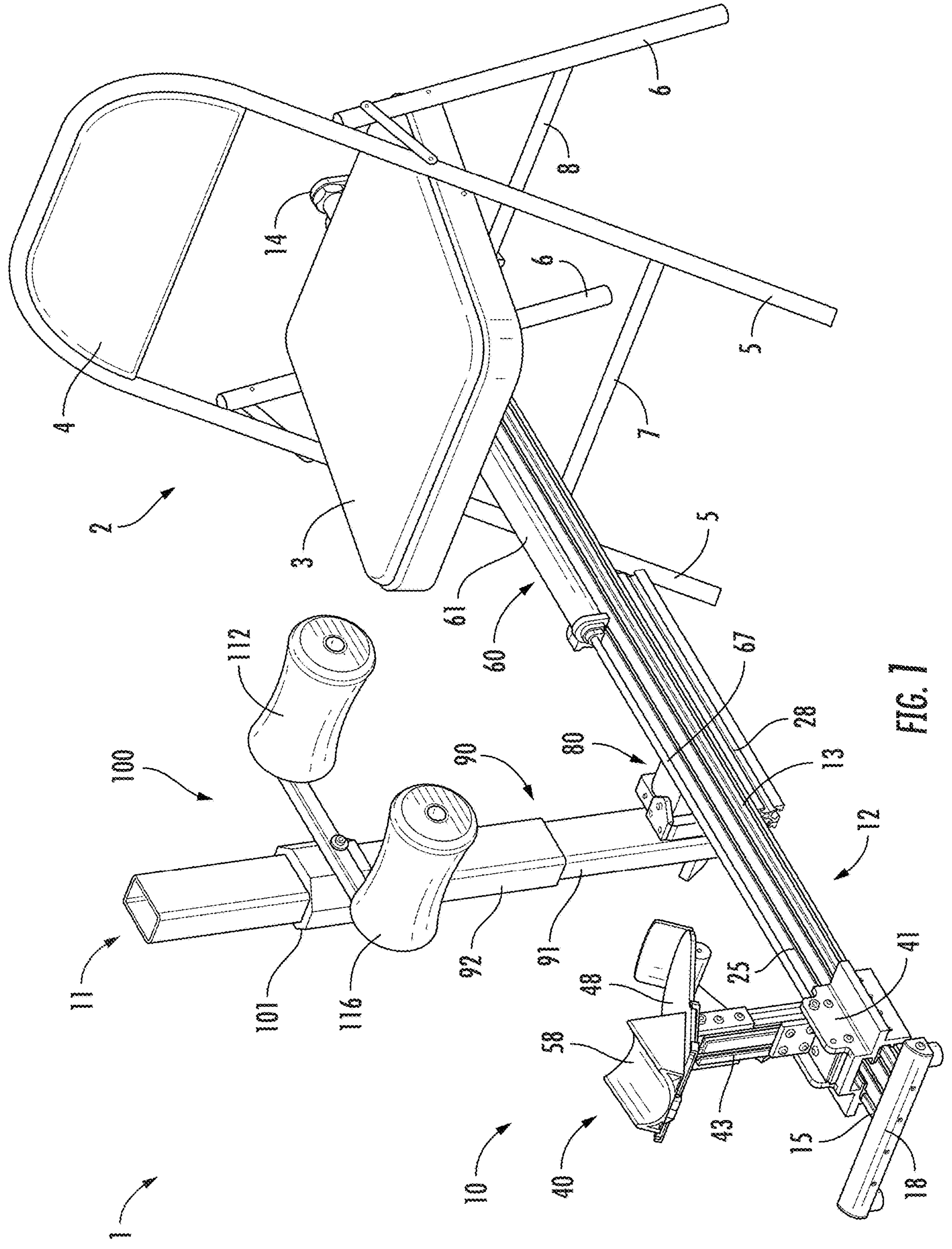
Figure 2:
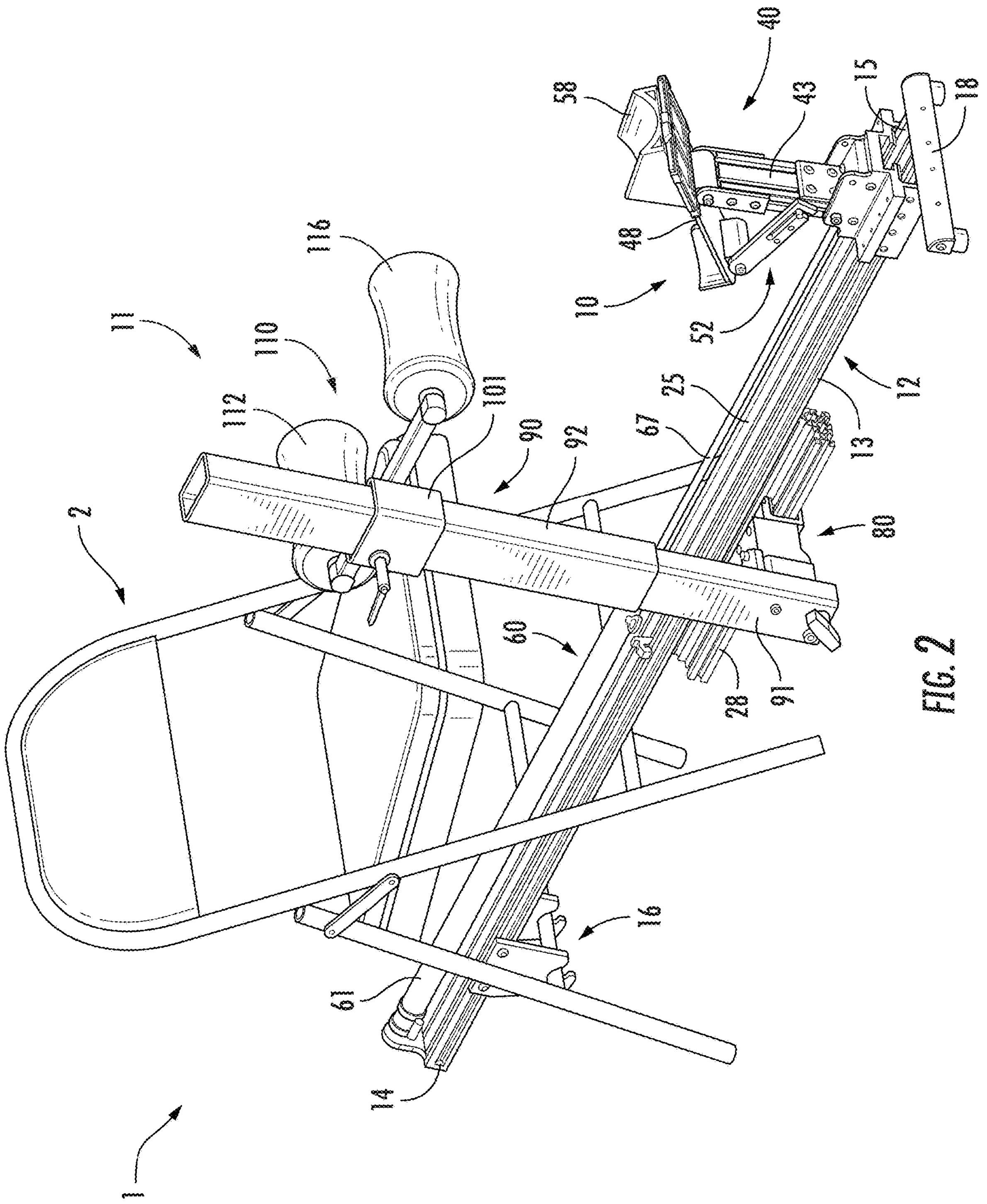
Figure 3:
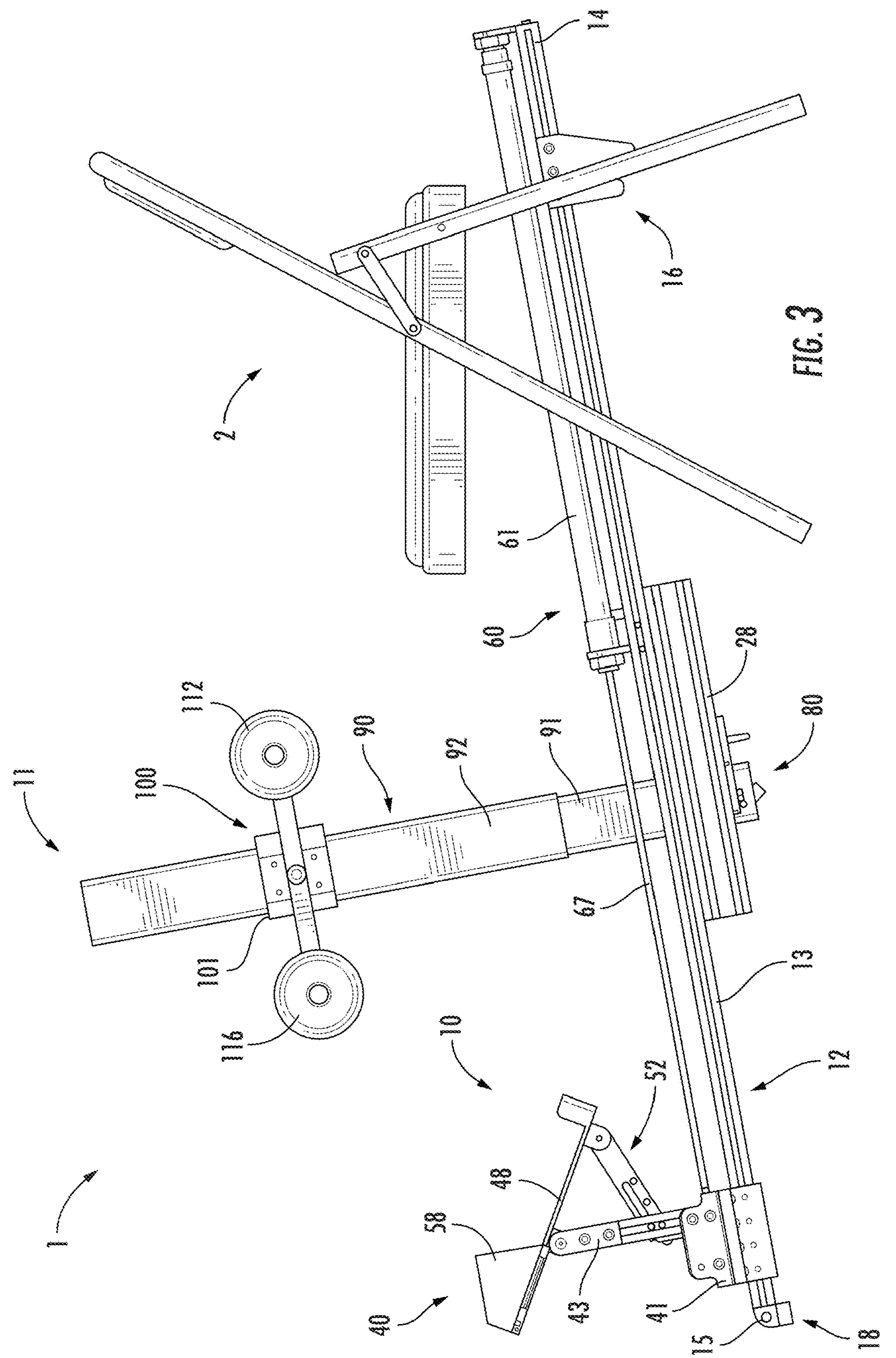
Figure 4:
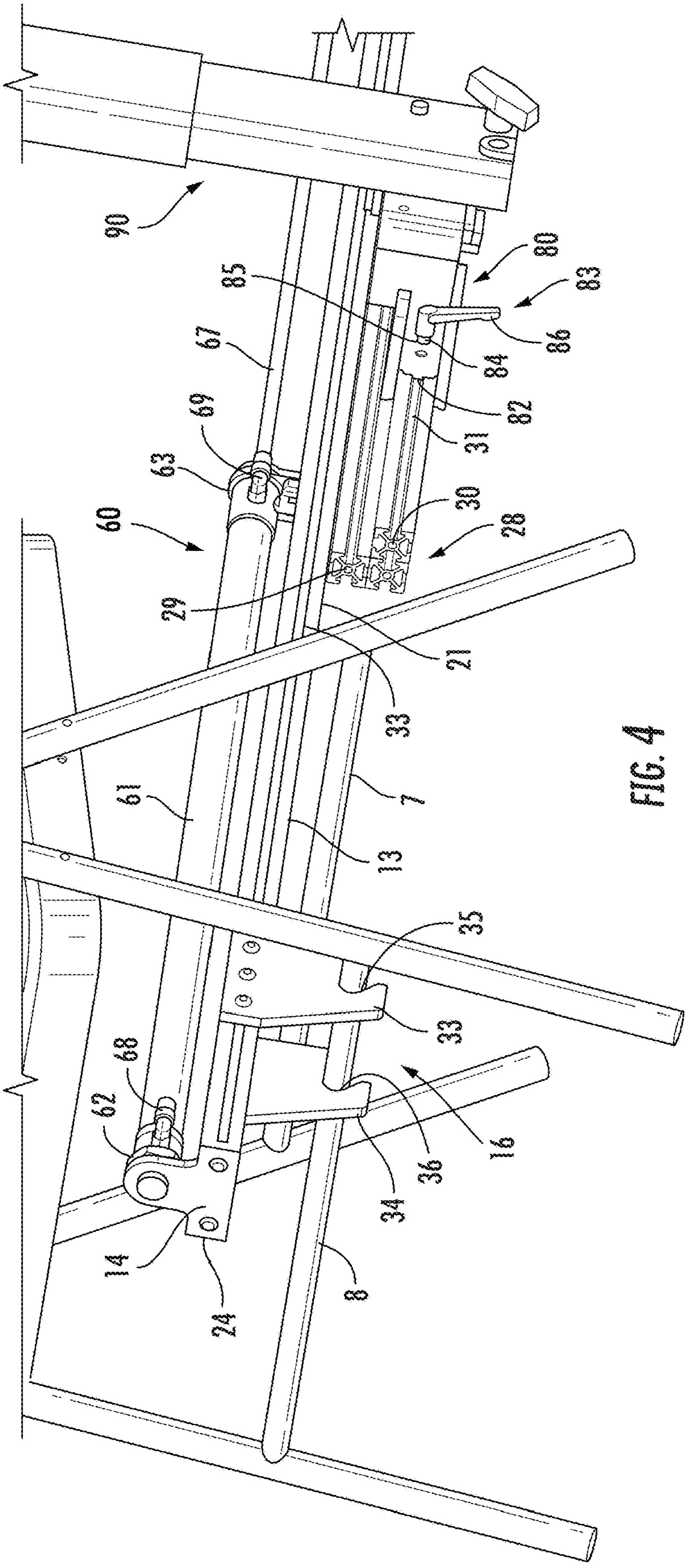
Figure 6:
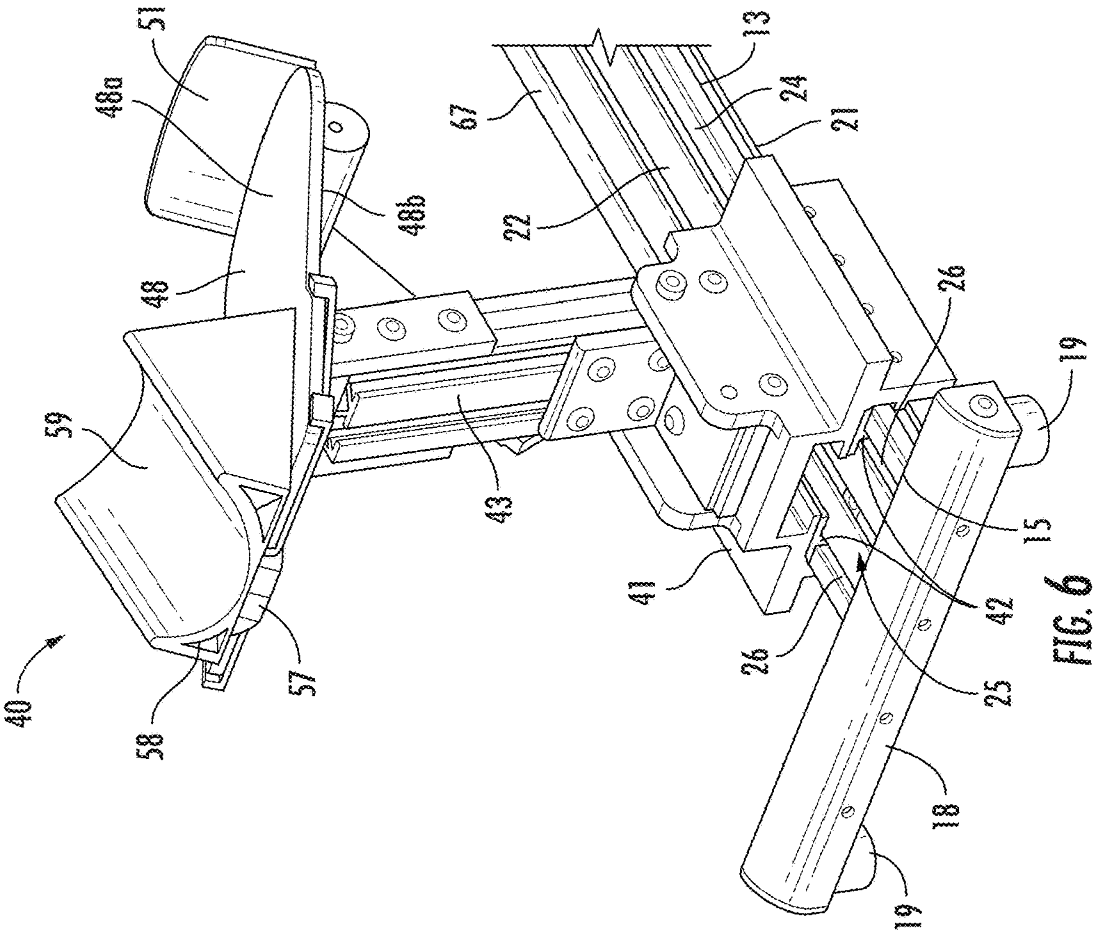
Figure 5:
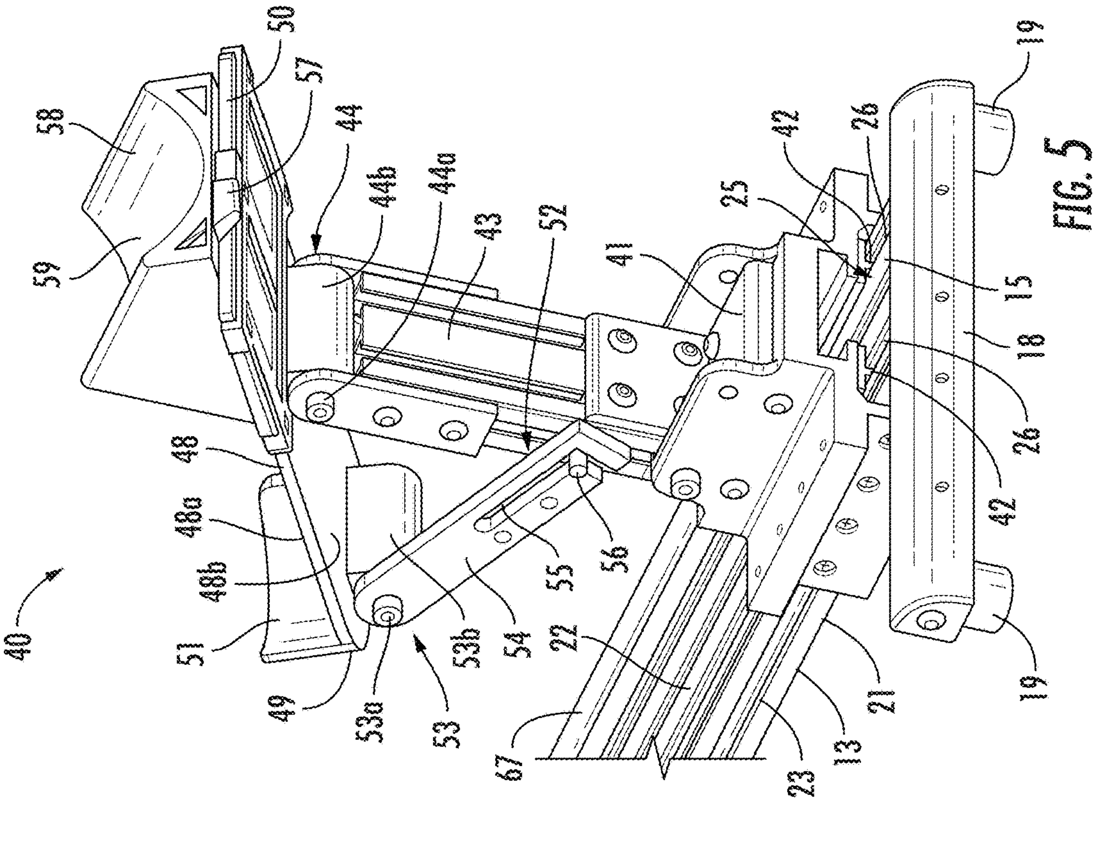
Figure 8:
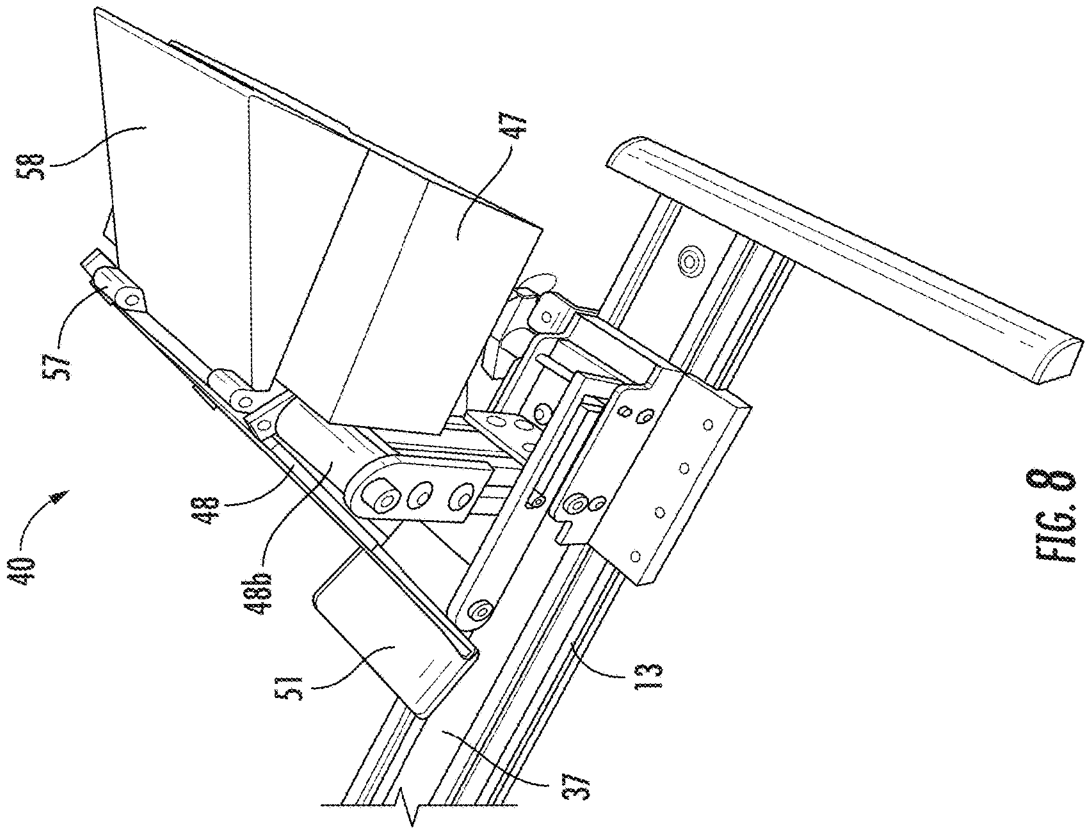
Figure 7:
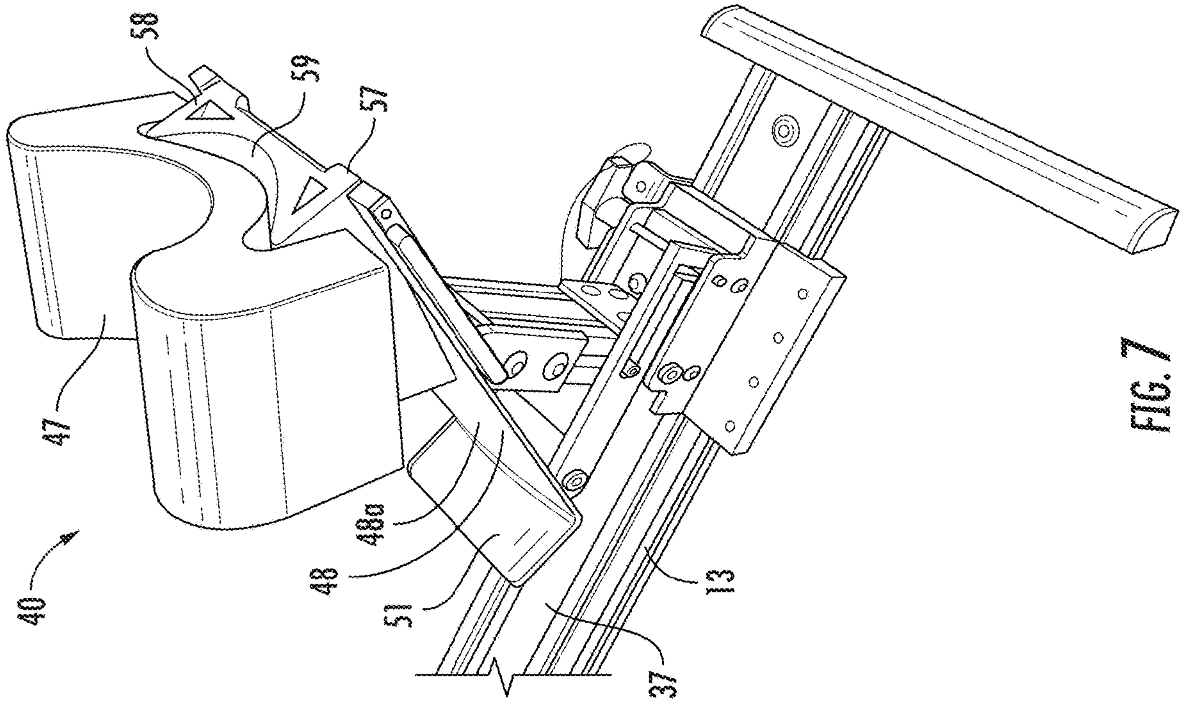
Figure 9:
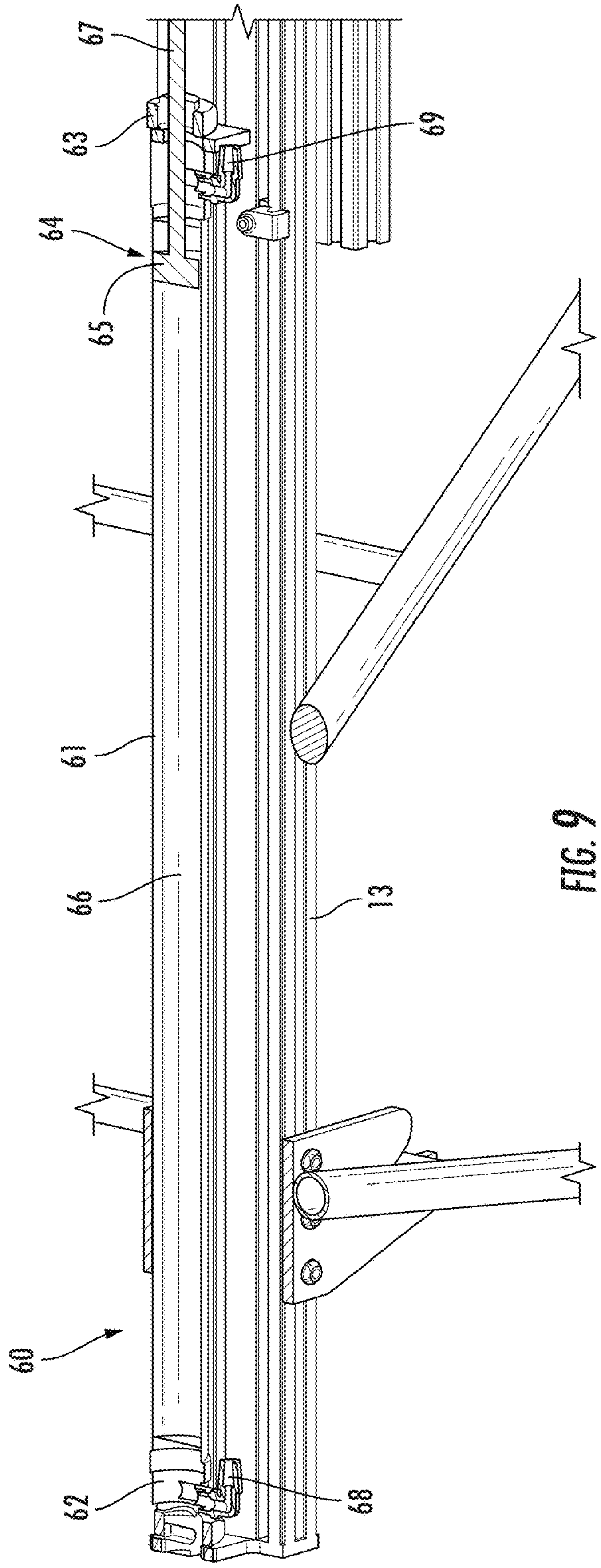
Figure 10:
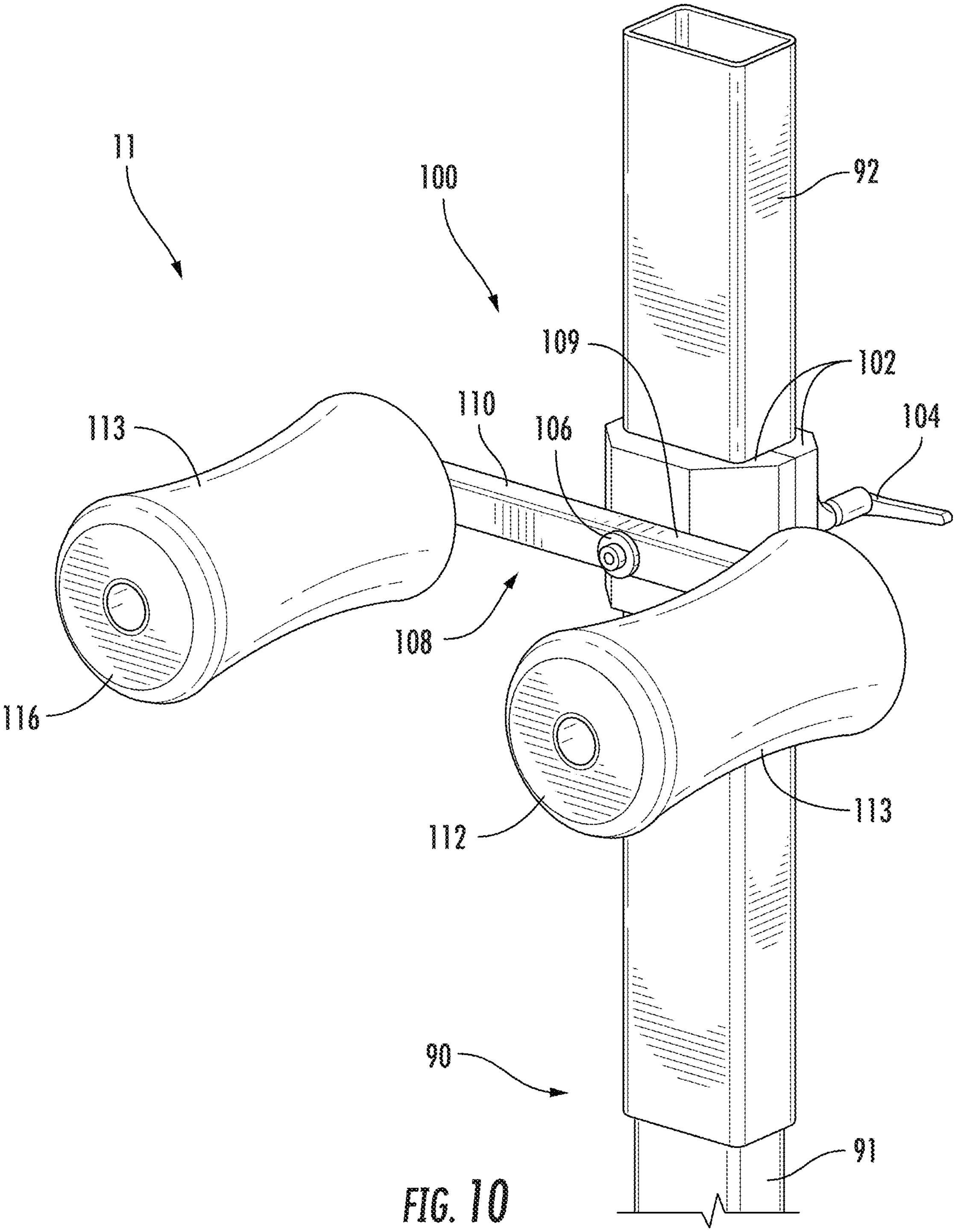
Figure 11:
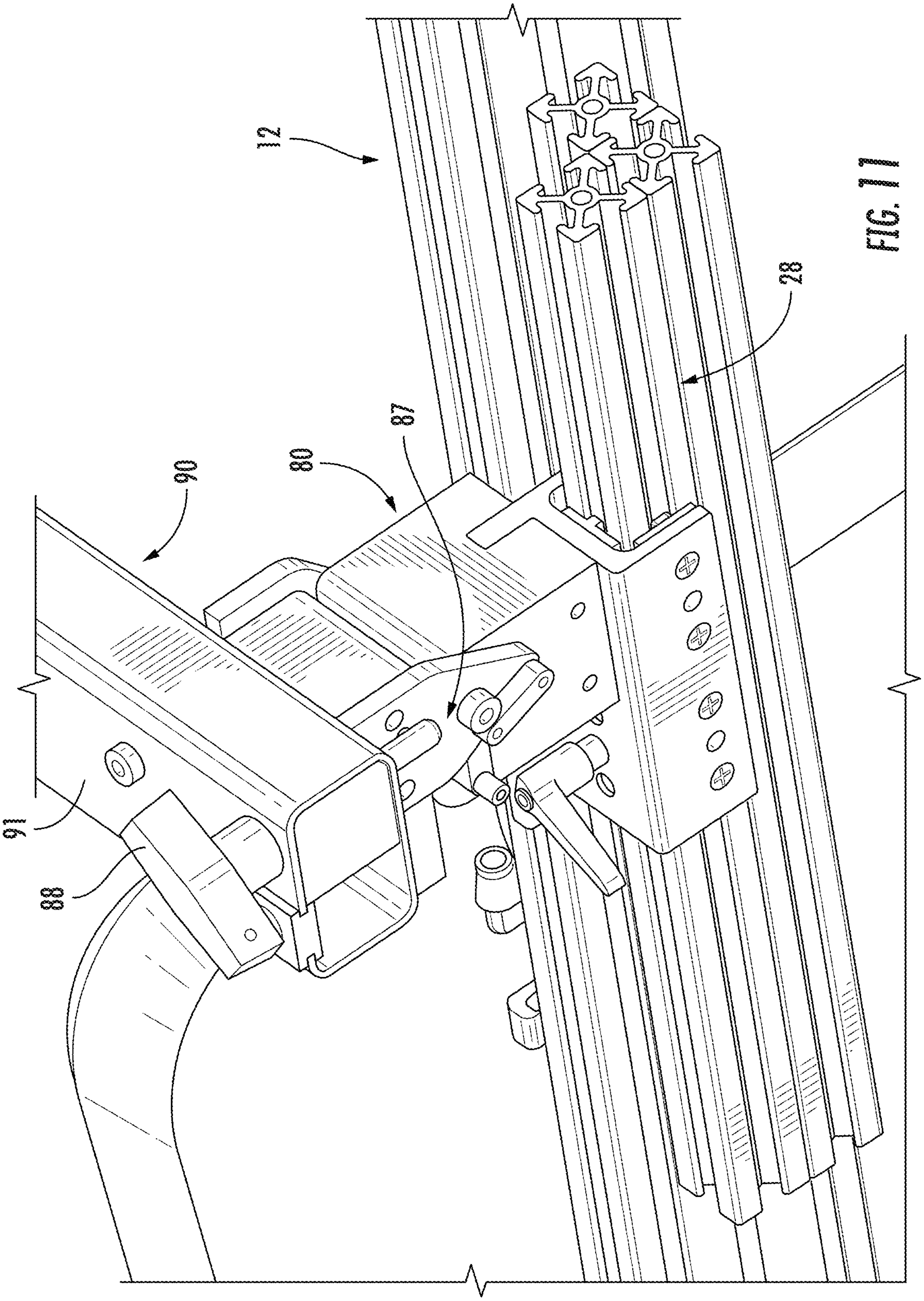
Figure 12:
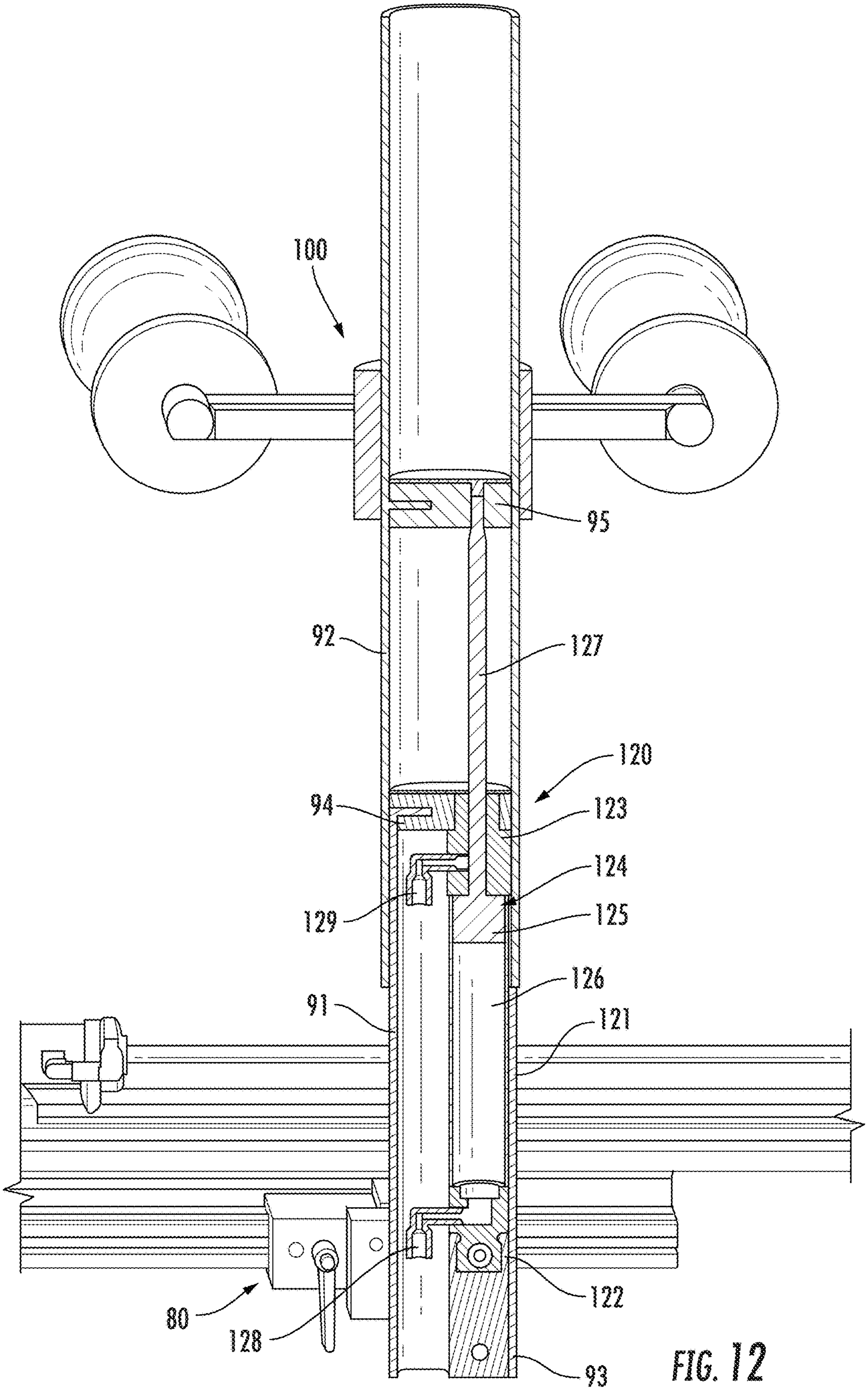
Figure 13:
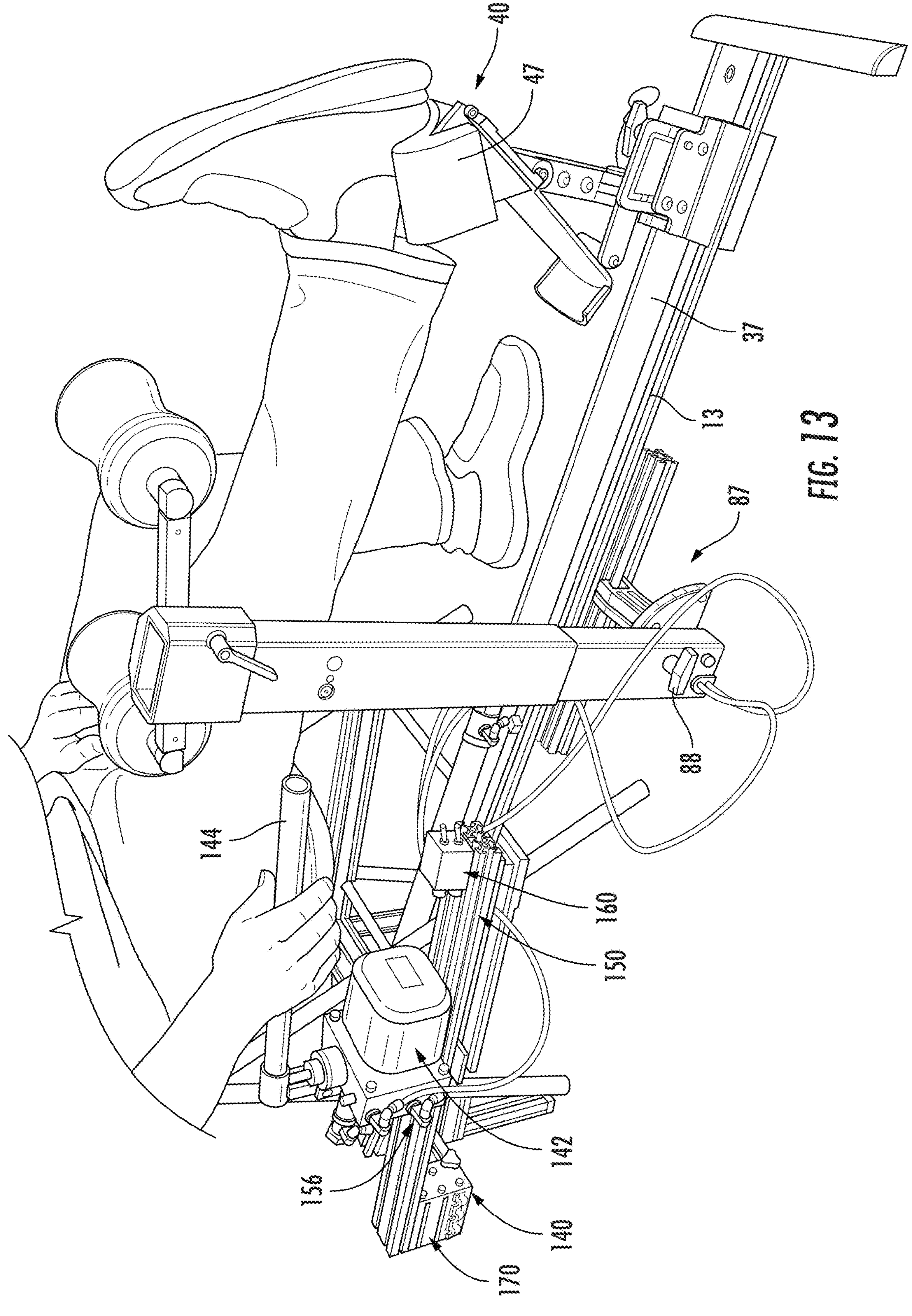
Figure 14:
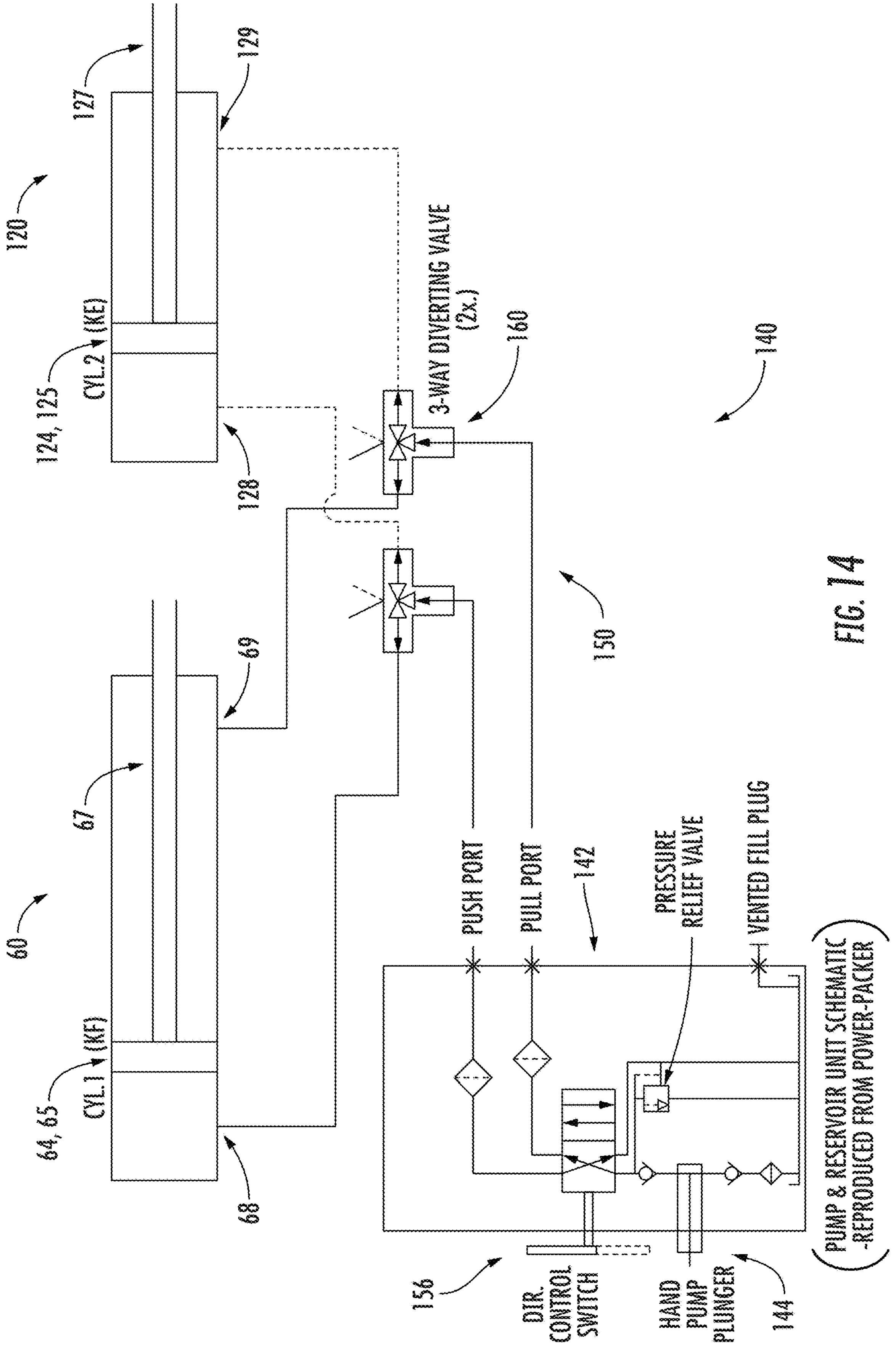
Figure 15:
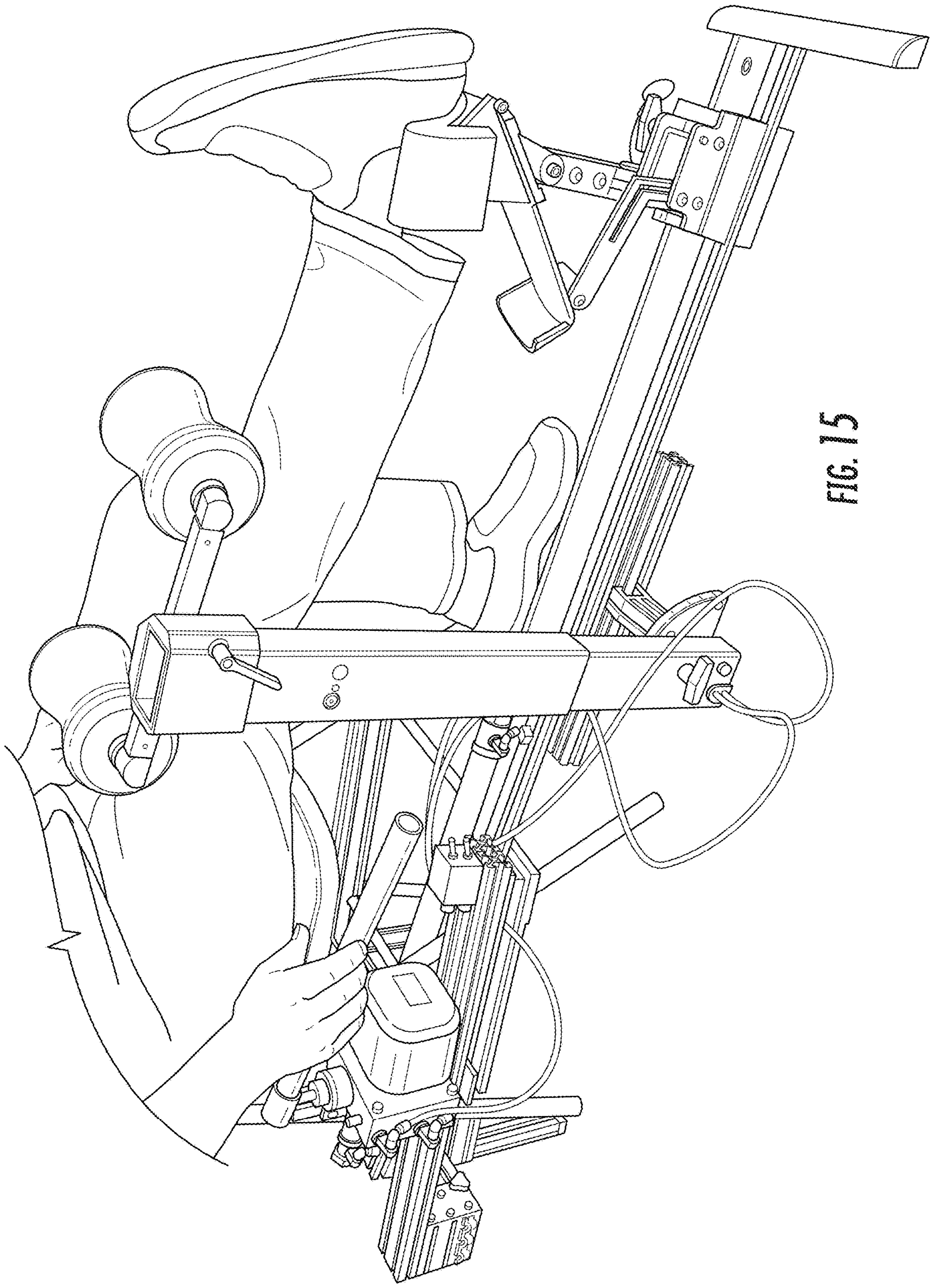
Figure 16:
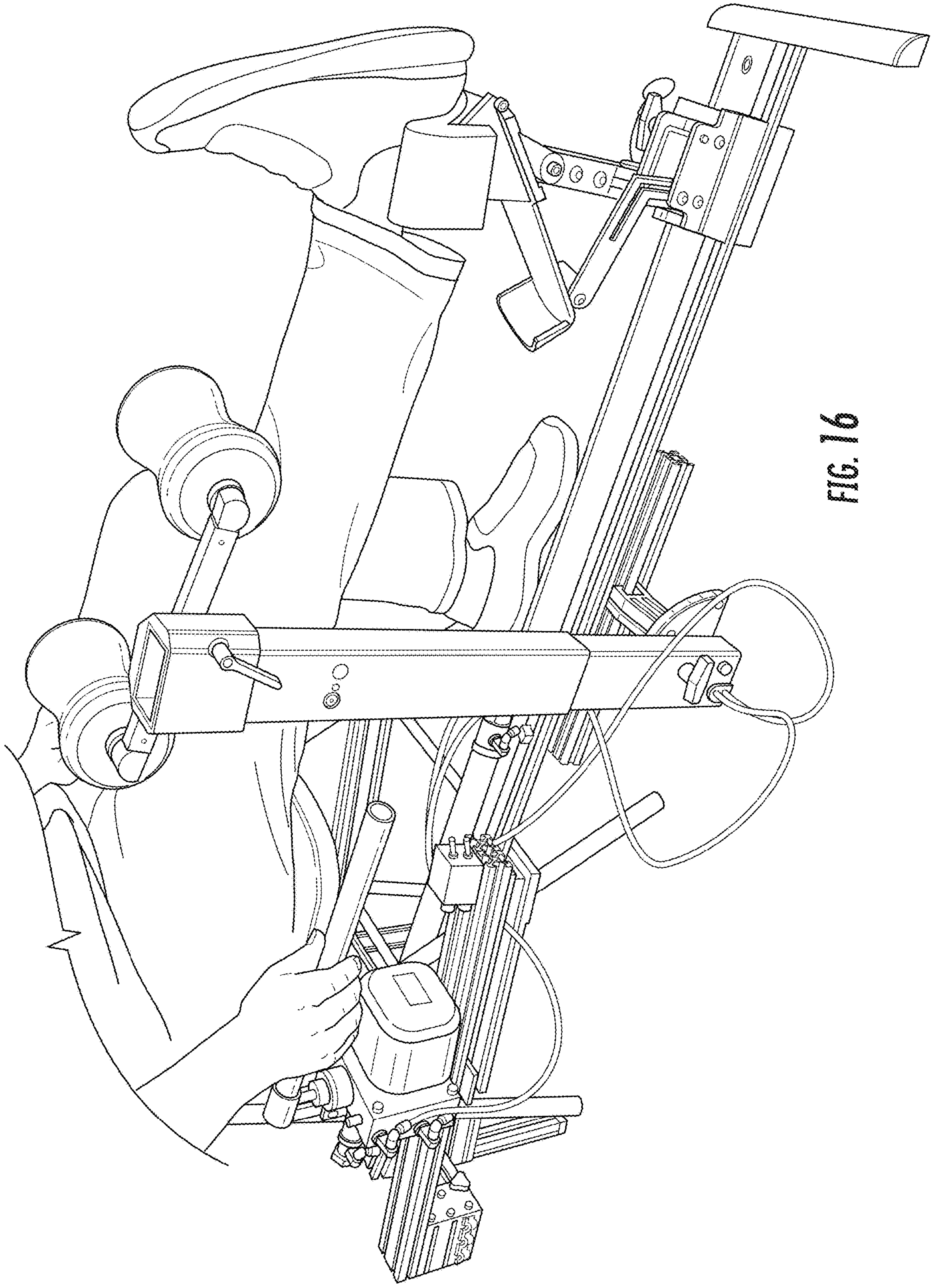
Figure 17:
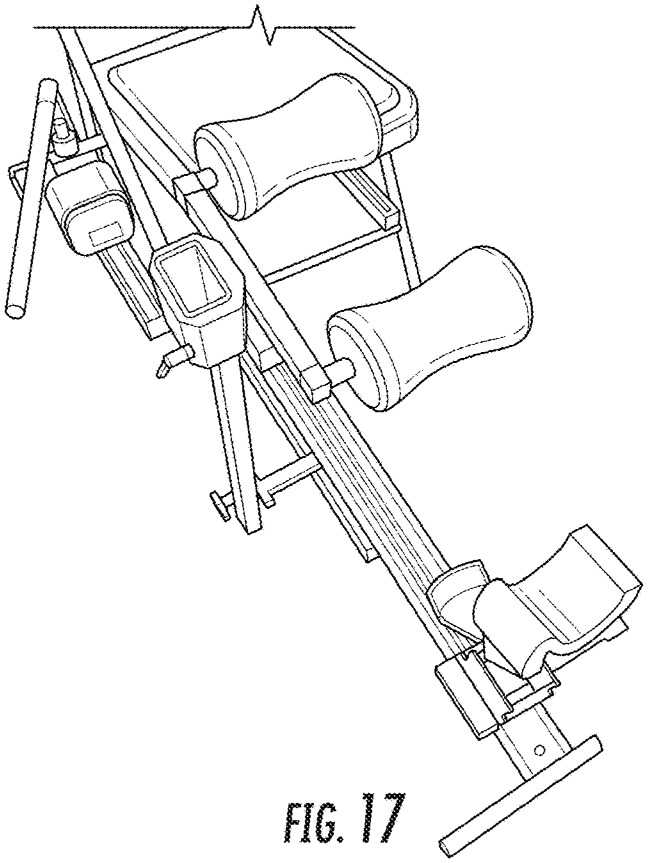
Figure 18:
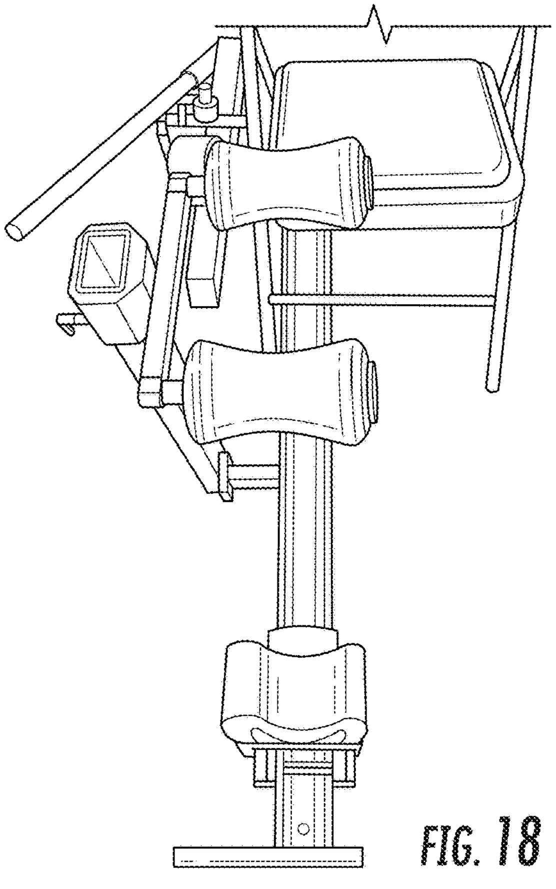
Figure 19:
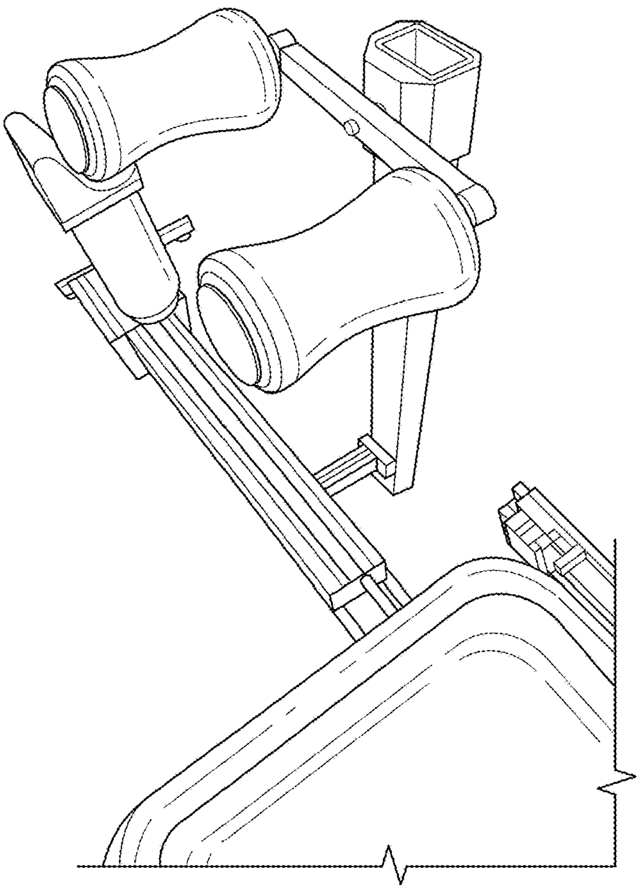
Figure 20:
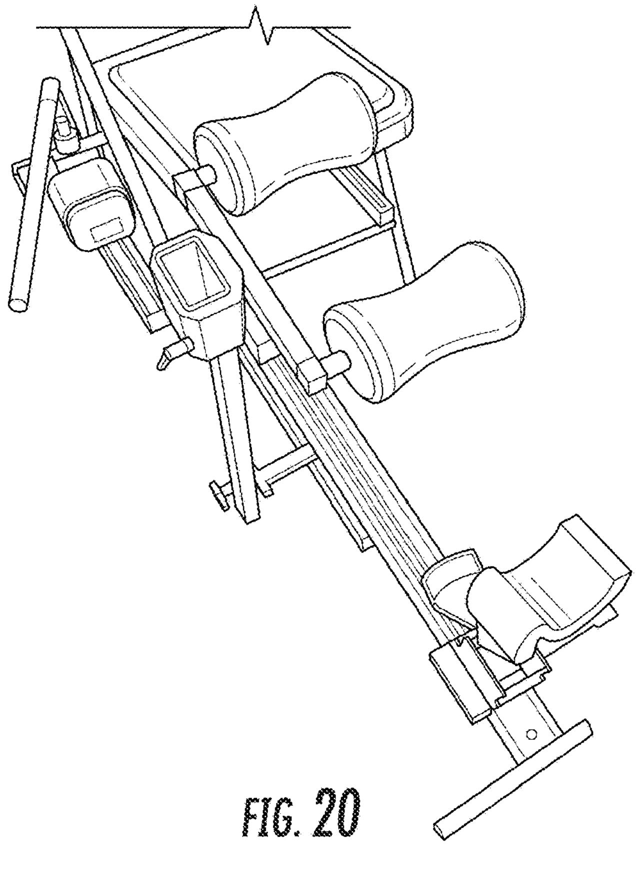

Having thus described embodiments of the invention in general terms, reference will now be made the accompanying drawings, wherein:

FIG. 1 is a front right perspective view of an orthotic device configured to perform both a flexion process and an extension process with respect to a knee joint according to an embodiment of the present invention;

FIG. 2 is a front left perspective view of the orthotic device;

FIG. 3 is a right side elevational view of the orthotic device;

FIG. 4 is an enlarged fragmentary rear perspective view of a lower portion of the orthotic device;

FIGS. 5 and 6 are enlarged fragmentary perspective views of a foot support assembly of the orthotic device;

FIGS. 7 and 8 are photographs of the orthotic device showing a rotatable ankle support structure of the foot support assembly;

FIG. 9 is an enlarged fragmentary cross-sectional view of a flexion hydraulic actuator of the orthotic device;

FIG. 10 is an enlarged fragmentary perspective view of an extension pad assembly of the orthotic device;

FIG. 11 is an enlarged fragmentary bottom perspective view of a toggle mechanism of the orthotic device;

FIG. 12 is an enlarged fragmentary cross-sectional view of an extension hydraulic actuator of the orthotic device;

FIG. 13 is a perspective photograph of the orthotic device when occupied by a user;

FIG. 14 is a schematic diagram of a fluid power system of the orthotic device;

FIGS. 15 and 16 are perspective photographs showing an extension process of the orthotic device relative to the user; and FIGS. 17-20 are various perspective photographs of the orthotic device.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Like numbers refer to like elements throughout.

FIGS. 1-20 illustrate an orthotic device 1 for assisting in improving the range of motion of a knee joint of a user is disclosed according to an embodiment of the present invention, which is hereinafter referred to as the device 1 for brevity. The device 1 is configured to provide for extension and/or flexion of the knee joint of the user with respect to a single structural assembly. The device 1 accordingly provides the benefit of being capable of improving the range of motion of the knee joint of the associated user during either or both of a straightening of the leg (extension) or the bending of the leg (flexion) at the corresponding knee joint. In some circumstances, the flexion of the knee joint may also aid in improving the range of motion of the ankle joint of the user, depending on the circumstances of the associated user of the device 1.

The device 1 generally includes a support frame 12, a knee flexion system 10 for carrying out a knee flexion process of the device 1, a knee extension system 11 for carrying out a knee extension process of the device 1, and a fluid power system 140 for communicating a common (hydraulic) fluid to each of the knee flexion system 10 and the knee extension system 11 based on a user selected mode of operation of the device 1. The device 1 is shown and described herein as being removably coupled to a chair 2 or other seating structure suitable for supporting the weight of the corresponding user when in a seated position.

Mounting and Support

The device 1 includes a support frame 12 configured for removable coupling to the chair 2. The support frame 12 and the chair 2 are each configured to rest on a floor surface, wherein the floor surface is generally planar and horizontally arranged.

The support frame 12 includes an elongate beam 13 extending longitudinally from a first end 14 of the support frame 12 to an opposing second end 15 thereof. The first end 14 of the support frame 12 includes a mounting assembly 16 and the second end 15 of the support frame 12 includes a support member 18. As used hereinafter, a longitudinal direction of the device 1 refers to those directions arranged parallel to the direction of longitudinal extension of the beam 13, a lateral direction of the device 1 refers to the direction arranged horizontally and perpendicular to the longitudinal direction of the device 1, and a height direction of the device 1 refers the direction arranged primarily vertically (with respect to the gravity direction) and perpendicular to each of the longitudinal direction and the lateral direction.

As best shown in FIGS. 5 and 6, the beam 13 includes a lower surface 21 facing towards the floor surface, an upper surface 22 disposed opposite the lower surface 21, a first lateral surface 23 connecting the lower surface 21 to the upper surface 22 at a first lateral side of the beam 13, and a second lateral surface 24 connecting the lower surface 21 to the upper surface 22 at a second lateral side of the beam 13, wherein each of the described surfaces 21, 22, 23, 24 extend longitudinally along the length of the beam 13.

The chair 2 is illustrated as being in the form of what is traditionally referred to as a folding chair including a seat 3, a back rest 4, a pair of front legs 5, a pair of rear legs 6, a front cross member 7, and a rear cross member 8. The legs 5, 6 and the corresponding cross members 7, 8 are disposed at a position below the seat 3 of the chair 2. The front cross member 7 extends laterally between and connects the spaced apart pair of the front legs 5 while the rear cross member 8 extends laterally between and connects the spaced apart pair of the rear legs 6. The front cross member 7 is arranged perpendicular to the direction of extension of each of the front legs 5 and the rear cross member 8 is similarly arranged perpendicular to the direction of extension of each of the rear legs 6.

The beam 13 includes a first rail structure 25 configured to be slidably engaged by a foot support carriage 41 of the foot support assembly 40. The first rail structure 25 allows for the foot support assembly 40 to selectively translate (slide) rectilinearly in the longitudinal direction of the beam 13 at positions between the seat 3 of the chair 2 and the second end 15 of the beam 13. The sliding of the foot support assembly 40 facilitates the knee flexion process of the device 1, as described in greater detail hereinafter.

The first rail structure 25 is shown herein as being formed by a plurality of longitudinal openings 26 formed in each of the surfaces 21, 22, 23, 24 of the support frame 12, wherein each of the longitudinal openings 26 includes a constant cross-sectional shape extended in the longitudinal direction of the beam 13 with each of the longitudinal openings 26 configured to receive a corresponding one of a plurality of projections 42 extending from the foot support carriage 41. More specifically, the lower surface 21 includes a pair of the longitudinal openings 26 laterally spaced from each other and configured to slidably receive a corresponding pair of the laterally spaced projections 42 extending upwardly from a portion of the foot support carriage 41 wrapped around an underside of the beam 13, the upper surface 22 includes a pair of the longitudinal openings 26 laterally spaced from each other and configured to slidably receive another corresponding pair of the laterally spaced projections 42 depending downwardly from a portion of the foot support carriage 41 overlaying the beam 13, and each of the lateral side surfaces 23, 24 includes one of the longitudinal openings 26 for receiving laterally extending projections 42 extending inwardly from opposing portions of the foot support carriage 41. Each of the pairings of one of the projections 42 and one of the longitudinal openings 26 may include an intervening roller, bearing, or the like for facilitating the sliding connection present between the foot support carriage 41 and the first rail structure 25, as desired.

The first rail 25 may alternatively be formed as a series of longitudinally extending projections (not shown) that are received within corresponding longitudinally extending openings (not shown) formed within the foot support carriage 41 of the foot support assembly 40, as desired, without departing from the scope of the present invention. Any suitable complimentary structures may be present within the disclosed components for forming the sliding connection between the support frame 12 and the foot support assembly 40, so long as the foot support assembly 40 is capable of smoothly sliding relative to the beam 13 with respect to the longitudinal direction thereof, wherein the sliding occurs along those positions corresponding to a range of motion of the foot of the associated user during the knee flexion process of the device 1.

As best shown in FIG. 4, a second rail structure 28 is coupled to the beam 13 and is configured to be slidably engaged by an extension carriage 80 of the extension system 11. The second rail structure 28 allows for the extension carriage 80 to selectively translate (slide) rectilinearly in the longitudinal direction of the beam 13 at positions adjacent the longitudinal center of the beam 13, such as those positions disposed adjacent a front surface of the seat 3 of the chair 2 corresponding to a position of the knee of the user of the device 1 when the foot of the user is positioned on the foot support assembly 40 adjacent the second end 15 of the support frame 12.

The second rail structure 28 is shown as including a substantially L-shaped cross-section with a first leg 29 of the L-shape connected to the lower surface 21 of the beam 13 and a second leg 30 of the L-shape extending laterally outwardly in a direction towards the first lateral surface 23 of the beam 13. The second leg 30 includes a plurality of longitudinal openings 31 in similar fashion to the first rail structure 25, wherein each of the longitudinal openings 31 is configured to receive a corresponding projection 82 extending from the extension carriage 80 for forming a rectilinear slidable connection between the second rail structure 28 and the extension carriage 80. As explained above, the second rail structure 28 may alternatively include a reversed configuration wherein the second rail structure 28 includes the projections and the extension carriage 80 includes the openings, as desired, so long as the described slidable connection is maintained. In the illustrated embodiment, the second leg 30 includes the longitudinal openings 31 in three different surfaces thereof to allow the extension carriage 80 to wrap around the second leg 30 for three different slidable connections, but other configurations may be utilized without departing from the scope of the present invention. For example, a portion of the extension carriage 80 may extend around to a portion of the first leg 29 formed to the second lateral side of the second rail structure 28 with the wrapped around portion including a pairing of at least one of the projections 82 with at least one of the longitudinal openings 31.

The mounting assembly 16 is shown as being configured for removable coupling to the previously described chair 2. More specifically, the mounting assembly 16 is shown as being removably mounted to the rear cross member 8 spanning the rear legs 6 of the chair 2, but may also be adapted for connection to the front cross member 7 of the chair 2 while maintaining the beneficial features of the device 1. The mounting assembly 16 includes a first bracket 33 and a laterally spaced apart second bracket 34. In the illustrated embodiment, the first bracket 33 is rigidly secured to the first lateral surface 23 of the beam 13 while the second bracket 34 is rigidly secured to the second lateral surface 24 of the beam 13, but any rigid connection may be formed between the brackets 33, 34 and the beam 13 adjacent the first end 14 of the support frame 12 so long as the brackets 33, 34 depend downwardly below the beam 13 for connection to one of the cross members 7, 8 of the chair 2. The first bracket 33 includes a first slot 35 extending inwardly and upwardly into the first bracket 33 from a lower disposed edge thereof and the second bracket 34 similarly includes a second slot 36 extending inwardly and upwardly into the second bracket 34 from a lower disposed edge thereof, wherein the first and second slots 35, 36 are each configured to be received over laterally spaced apart portions of one of the cross members 7, 8 therein to support the first end 14 of the support frame 12 on the chair 2 at a position elevated relative to the corresponding floor surface. However, the mounting assembly 16 may include contrary structures for supporting the first end 14 of the support frame 12 to the chair 2 without departing from the scope of the present invention, so long as the position of the beam 13 relative to the chair 2 is maintained during use of the device 1 for either of the extension process or the flexion process thereof.

The support member 18 is coupled to the second end 15 of the support frame 12 at an end of the beam 13 and is arranged transversely relative thereto. Specifically, the support member 18 is provided as a bar, beam, or rod extending laterally beyond each of the lateral side surfaces 23, 24 of the beam 13 to provide support and prevent a tipping of the support frame 12 about the longitudinal axis thereof. Each of the opposing ends of the support member 18 may include an elastomeric pad 19 or the like for direct contact with the underlying supporting surface to prevent motion of the support frame 12 and/or to dampen any vibrations generated by the device 1.

As shown in FIGS. 7, 8, and 13, the beam 13 may further include a position indicator 37 formed or disposed thereon for determining a position of either of the foot support assembly 40 or the extension carriage 80 relative to the longitudinal direction of the beam 13. The position indicator 37 may be in the form of a ruler or the like coupled to or printed directly onto the beam 13 with periodic markings or the like corresponding to specific distances in the longitudinal direction of the beam 13. The position indicator 37 allows for either of the described carriages 40, 80 to be reliably positioned relative to each individual user of the device 1 prior to the initiation of the corresponding process to accommodate the dimensions of each individual user. The position indicator 37 is also capable of measuring the progress of the user during the knee flexion process by clearly indicating how far the foot support assembly 40 has linearly translated during the bending of the knee and the movement of the foot of the user towards the position of the chair 2.

As best shown in FIGS. 3 and 13, when the first end 14 of the support frame 12 is supported on the chair 2 and the second end 15 of the support frame 12 is supported on the underlying floor surface, the beam 13, and the support frame 12 more generally, is arranged at an incline relative to the floor surface. The angle of inclination of the beam 13 may be within the range of about 10-15 degrees, as a non-limiting example. The aforementioned height direction of the device 1 may similarly be arranged at about 10-15 degrees relative to the vertical direction in accordance with the angle of inclination of the beam 13.

The device 1 is shown herein as being positioned relative to the chair 2 for alignment with the right leg of the associated user, but the device 1 may also be adapted for readjustment to be aligned with the left leg of the user. For example, the second rail structure 28 and the associated extension carriage 80 may be positioned to the opposite lateral side of the beam 13 to more easily accommodate the left leg of the user, while the beam 13 may be slid via the mounting assembly 16 to the opposing lateral side of the corresponding cross member 7, 8. The components of the device 1 may be mirrored or configured for reversibility relative to the support frame 12 for accommodating the other leg of the user.

The support frame 12 is shown and described as being coupled to a specific configuration of the chair 2 including the cross members 7, 8, but it should be apparent that the support frame 12 and the remainder of the device 1 may be adapted for connection or incorporation into a variety of different seating structure shapes and configurations so long as the device 1 maintains the illustrated relationships with respect to the leg or legs of the user. For example, rather than being removably coupled to the described cross members 7, 8 of the chair 2, the device 1 may be incorporated directly into a seating structure or the like, such as including the first end 14 of the support frame 12 permanently affixed to a corresponding portion of the seating structure in place of the use of the mounting assembly 16.

Unless noted otherwise, the components described as forming the support frame 12 may be made of any suitable rigid materials capable of supporting other parts of the device 1 and the user when seated at the chair 2. Examples of suitable materials include, but are not limited to, steel, aluminum, iron, plastic, fiber reinforced carbon, other metals, or various alloys or composites. Each of the described components of the support frame 12 may be made of the same material or combinations of different suitable materials. The beam 13 (which forms the first rail structure 25 in the present embodiment) and the second rail structure 28 may be provided as 't-slot' extrusions having one or more slots or channels for ease of connection and adjustability, wherein the slots or channels may form the aforementioned longitudinal openings 26, 31 for forming the slidable connections with the carriages 40, 80. It is envisioned that other shapes such as round bars, tubular beams, or other suitable alternatives can be used so long as the described relationships are maintained for sliding the carriage assemblies 40, 80 as described herein.

The connections or couplings formed between the different components forming the support frame 12 may be accomplished using any suitable fastening methods such as the use of threaded fasteners, rivets, interlocking slots, tongue and groove connections, welding, brazing, chemical joining, clamps, and other suitable fastening methods, so long as the fastening methods utilized maintain the described structural configurations while supporting the user of the device 1 during normal operation thereof.

Knee Flexion System

The knee flexion system 10 generally includes the foot support assembly 40 and a flexion hydraulic actuator 60 for selectively adjusting a position of the foot support assembly 40 relative to the stationary support frame 12 during the flexion process, wherein the flexion hydraulic actuator 60 is powered by the fluid power system 140. The term "fluid" in connection with a "fluid power system" is intended to refer to either a liquid-based or hydraulic system or a gaseous-based or pneumatic system. To be clear, the knee flexion system could alternatively be powered by a hydraulic system, a pneumatic system or an electro-mechanical system utilizing a geared mechanical system and/or a motor.

The foot support assembly 40 of the flexion system 10 generally includes the foot support carriage 41, a foot plate 48, an inclination adjustment assembly 52, and an ankle support structure 58. As mentioned previously, the foot support carriage 41 is slidably disposed on the first rail structure 25 via the cooperating connection between the projections 42 and the t-slots forming the longitudinal openings 26 in the beam 13, wherein the longitudinal position of the foot support carriage 41 may be established by reference to the markings established on the position indicator 37 provided on the beam 13. The foot support carriage 41 accordingly forms a slidable base on which the remainder of the foot support assembly 40 translates relative to the beam 13. However, alternative configurations may be utilized wherein the foot support carriage 41 and the remainder of the foot support assembly 40 are configured to translate relative to the longitudinal direction of the support frame 12 while remaining within the scope of the present invention.

An upstanding member 43 extends upwardly in the height direction of the device 1 from a portion of the foot support carriage 41 engaging the beam 13. The upstanding member 43 supports the foot plate 48 and the ankle support structure 58 at a distance from the beam 13. The upstanding member 43 extends in the height direction at a distance substantially corresponding to the distance present between the seat 3 of the chair 2 and the portion of the beam 13 disposed beneath the front of the seat 3 to allow for the leg of the user to be substantially straight when fully extended with the foot support assembly 40 positioned adjacent the second 15 of the support frame 12. The upstanding member 43 is shown as being formed from an extrusion similar in structure to the beam 13, but alternative configurations may be utilized without departing from the scope of the present invention.

An end of the upstanding member 43 opposite the slidably engaging portion of the foot support carriage 41 includes a first pivot element 44 providing an axis of rotation for the foot plate 48 to pivot relative to the upstanding member 43. The first pivot element 44 is shown as a hinged connection including a pin 44*a* extending laterally between laterally spaced brackets coupled to the lateral sides of the upstanding member 43 and a hinge knuckle 44*b* extending from a downwardly facing surface of the foot plate 48 with the hinge knuckle 44*b* including a laterally extending opening rotatably receiving the pin 44*a* of the upstanding member 43. However, a reversed configuration or alternative pivotal connection may be formed between the upstanding member 43 and the foot plate 48 so long as the foot plate 48 can pivot relative to the upstanding member 43 during the flexion process.

The foot plate 48 is substantially planar in configuration and includes a size and shape suitable for reception of the bottom of the foot of the user on an upwardly facing surface thereof. The foot plate 48 extends longitudinally from a first end 49 positioned towards the chair 2 to a second end 50 positioned towards the second end 15 of the support frame 12. A heel support 51 extends transversely from the foot plate 48 at the first end 49 thereof and includes a concave surface for the heel of the user to rest against when the foot of the user is placed on the foot plate 48. The foot plate 48 includes a foot support surface 48*a* on which the foot of the user is configured to rest and an opposite surface 49*b* facing away from the foot support surface 48*a*.

The inclination adjustment assembly 52 includes a second pivot element 53, an adjustment plate 54, and a positioning pin 56. The positioning pin 56 is a shaft or rod extending laterally from the upstanding member 43 of the foot support carriage 41. The second pivot element 53 provides an axis of rotation for the adjustment plate 54 to pivot relative to the first end 49 of the foot plate 48. The second pivot element 53 is shown as a hinged connection including a pin 53*a* extending laterally from an end of the adjustment plate 54 adjacent the foot plate 48 and a hinge knuckle 53*b* extending from the downwardly facing surface of the foot plate 48 at the first end 49 thereof. However, a reversed configuration or alternative pivotal connection may be formed between the first end 49 of the foot plate 48 and the adjustment plate 54 so long as the adjustment plate 54 can pivot relative to the foot plate 48.

The adjustment plate 54 includes an L-shaped slot 55 formed therein with the slot 55 extending from an outer edge of the adjustment plate 54. The slot 55 is configured to slidably receive the positioning pin 56 therein in a manner wherein a position of the stationary positioning pin 56 within the slot 55 corresponds to an angle of inclination of the foot plate 48 relative to the floor surface on which the device 1 rests. As the positioning pin 56 slides within the slot 55 the adjustment plate 54 pivots relative to the foot plate 48 about the second pivot element 53 while the foot plate 48 pivots relative to the upstanding member 43 about the first pivot element 44. Movement of the positioning pin 56 within the slot 55 in a direction towards the first end 49 of the foot plate 48 corresponds to an increase of the angle of inclination present between the foot plate 48 and the supporting surface while movement of the positioning pin 56 within the slot 55 in an opposite direction away from the first end 49 of the foot plate 48 corresponds to a reduction in the angle of inclination present between the foot plate 48 and the supporting surface. The positioning pin 56 may also be removed from the slot 55 to allow for a collapsing of the foot plate 48 to a position substantially parallel to the upstanding member 43.

The second end 50 of the foot plate 48 includes a hinge mechanism 57 configured to allow for a pivoting of the ankle support structure 58 relative to the foot plate 48. The ankle support structure 58 is configured for rotational adjustment between a first position resting on the foot support surface 48*a* of the foot plate 48 (FIG. 7) and a second position wherein the ankle support structure 58 faces towards the downwardly facing opposite surface 48*b* of the foot plate 48 (FIG. 8). The first position corresponds to the ankle support structure 58 being utilized during the extension process of the device 1 wherein the ankle of the user can rest on a support surface of the ankle support structure 58 formed by a concave surface 59 formed in the ankle support structure 58 while the leg of the user is being extended. The concave surface 59 forming the ankle support surface may be formed longitudinally through the ankle support 58 at an incline relative to the foot support surface 48*a* of the foot plate 48 when the ankle support structure 58 is in the first position to accommodate the different angular orientation of the leg of the user present between the extension process and the flexion process. The inclined arrangement may be established by the ankle support structure 58 having a substantially triangular shape when viewed in profile.

The ankle support 58 may include a pad 47 (FIGS. 7 and 8) resting thereon having substantially the same configuration as the ankle support 58 including an inclined concave surface for receiving the ankle of the user therein and forming the ankle support surface of the ankle support structure 58. The pad 47 may be formed from a relatively soft and compressible material for ensuring the comfort of the ankle of the user, such as being formed from a cushion-like construction or a compressible elastomeric or foam-like material, as non-limiting examples. The pad 47 may be removable to allow for the pad 47 to be changed for each respective user of the device 1. The described second position of the ankle support structure 58 removes the ankle support structure 58 from the upwardly facing surface of the foot plate 48 to provide an unobstructed surface for the placement of the sole of the foot of the user thereon during the flexion process of the device 1.

The flexion hydraulic actuator 60 is a linear actuator configured to control the position of the foot support assembly 40 during the flexion process of the device 1. Specifically, the flexion hydraulic actuator 60 is configured to translate (slide) the foot support assembly 40 towards the chair 2 when the knee is being progressively flexed to a bent configuration as well as to translate (slide) the foot support assembly 40 towards the second end 15 of the support frame 12 following the completion of one repetition of the flexion process.

As best shown in FIGS. 4 and 9, the flexion hydraulic actuator 60 includes a piston housing (cylinder) 61 disposed on the upper surface 21 of the beam 13. The piston housing 61 extends longitudinally from a first end 62 disposed at or adjacent the first end 14 of the support frame 12 to a second end 63 disposed at a position spaced from the first end 14 and towards the second end 15 of the support frame 12. The piston housing 61 slidably receives a piston 64 therein including a piston head 65 extending across a chamber 66 formed within the piston housing 61 and a piston rod 67 extending from the piston head 66 and out of the piston housing 61. An end of the piston rod 67 disposed opposite the piston head 65 is rigidly coupled to the foot support carriage 41 of the foot support assembly 40 to cause the foot support assembly 40 to move in unison with the piston 65.

A first fluid connection 68 is formed at the first end 62 of the piston housing 61 and a second fluid connection 69 is formed at the second end 63 of the piston housing 61. The first fluid connection 68 provides fluid communication with a portion of the chamber 66 disposed to a first side of the piston head 65 while the second fluid connection 69 provides fluid communication with a portion of the chamber 66 disposed to an opposing second side of the piston head 65, wherein the portions of the chamber 66 vary based on the position of the piston 64. The fluid is preferably a suitable hydraulic fluid.

As is conventional, the introduction of a greater fluid pressure to a side of the piston head 65 associated with the first fluid connection 68 causes the piston rod 67 and the foot support assembly 40 to slide towards the second end 15 of the support frame 12 while the introduction of the greater fluid pressure to a side of the piston head 65 associated with the second fluid connection 68 causes the piston rod 67 and the foot support assembly 40 to slide towards the first end 14 of the support frame 12. The piston head 65 is accordingly adjustable between a first position adjacent the first end 62 of the piston housing 61, a second position adjacent the second end 63 of the piston housing 61 (shown in FIGS. 4 and 9), and a plurality of intermediate positions between the first and second positions, wherein each of the aforementioned positions is determined based on a pressure differential present between the opposing sides of the piston head 65 in fluid communication with the respective fluid connections 68, 69. As explained hereinafter, the fluid power system 140 is adjustable to control the flow of the fluid to the chamber 66 on the opposing sides of the piston head 65 as communicated by the different fluid connections 68, 69.

Alternate embodiments of the invention may use a power system 140 that is or includes a hydraulic system, a pneumatic system and/or an electro-mechanical system that may include geared mechanical system and/or a motor. Embodiments using a pneumatic system may use a cylinder and piston driven by pressurized air. Embodiments using an electro-mechanical system may be powered by standard 120V or 240V power supply that powers a motorized force application such as by driving one or more gears configured in a geared mechanical system for transferring force.

Unless noted otherwise, the components described as forming the knee flexion system 10 may be made of any suitable rigid materials capable of withstanding the forces applied during the flexion process. Examples of suitable materials include, but are not limited to, steel, aluminum, iron, plastic, fiber reinforced carbon, other metals, or various alloys or composites. Each of the described components forming the knee flexion system 10 may be made of the same material or combinations of different suitable materials. Each of the connections or couplings formed between the different components forming the knee flexion system 10 may be accomplished using any suitable fastening methods such as the use of threaded fasteners, rivets, interlocking slots, tongue and groove connections, welding, brazing, chemical joining, clamps, and other suitable fastening methods, so long as the fastening methods utilized maintain the described structural configurations while withstanding the forces generated during the flexion process of the device 1.

Knee Extension System

The knee extension system 11 generally includes the extension carriage 80, a column assembly 90, an extension pad assembly 100, and an extension hydraulic actuator 120, wherein the extension hydraulic actuator 120 is powered by the fluid power system 140. The ankle support structure 58 of the foot support assembly 40 is also utilized as a support surface for the foot of the user during the knee extension process of the device 1.

The extension carriage 80 allows for the knee extension system 11 to be linearly translated (slid) relative to the support frame 12, and more particularly the second rail structure 28 coupled to the beam 13. As explained hereinabove, the sliding of the extension carriage 80 relative to the second rail structure 28 occurs in a direction parallel to the longitudinal direction of the beam 13. The sliding of the knee extension system 11 facilitates the alignment of the knee of the user with the extension pad assembly 100 for carrying out the knee extension process when the foot of the user is supported on the ankle support 58 of the foot support assembly 40.

The extension carriage 80 forms a base for supporting the remainder of the knee extension system 11. As explained above, the extension carriage 80 includes the projections 82 or the like for slidably engaging at least one of the longitudinal openings 31 formed in the second rail structure 28 to adjust the position of the knee extension system 11 with respect to the longitudinal direction. The extension carriage 80 further includes a position locking feature in the form of a clamping mechanism 83 configured to removably affix a position of the extension carriage 80, and hence the remainder of the knee extension system 11, relative to the longitudinal direction.

The clamping mechanism 83 is shown as including a threaded rod 84 that is rotatably adjustable to control a depth of the threaded rod 84 relative to a corresponding threaded opening 85 formed through a portion of the extension carriage 80 adjacent the second rail structure 28. The threaded rod 84 includes a handle 86 that aids in rotating the threaded rod 84 in a manner causing the cooperating threads of the threaded rod 84 and the threaded opening 85 to draw the threaded rod 84 towards the second rail structure 28. For example, the threaded rod 84 may be aligned with one of the longitudinal openings 31 facing towards the threaded rod 84 to allow for an end (not shown) of the threaded rod 84 to enter into the longitudinal opening 31 for engagement with a surface of the second rail structure 28 defining the longitudinal opening 31. Continued rotation of the threaded rod 84 causes the end thereof to engage the second rail structure 28 and apply a clamping force thereto via an opposing force supplied by any of the projections 82 formed in the surfaces perpendicular to or opposite the portion of the extension carriage 80 including the clamping mechanism 83. A frictional force formed perpendicular to the clamping force prevents undesired movement of the extension carriage 80 along the second rail structure 28 until the reverse rotation of the threaded rod 84 releases the clamping force.

However, alternative methods of locking the position of the extension carriage 80 via a position locking feature may also be used, such as the use of a series of spaced apart openings (not shown) present within the second rail structure 28 that are configured to receive a pin or the like also passed through an aligned opening of the extension carriage 80, thereby locking the position of the extension carriage 80.

The column assembly 90 extends in a transverse direction arranged transverse to the longitudinal direction of the support frame 12. The column assembly 90 may, for example, extend in the height direction arranged perpendicular to the longitudinal direction, as desired. However, other transverse directions oriented at an incline to the height direction may also be utilized as described hereinafter. The transverse extension of the column assembly 90 spaces the extension pad assembly 100 at a position for applying a downward force to the knee joint of the user during the knee extension process.

The column assembly 90 is configured to selectively change a position of the extension pad assembly 100 relative to the extension carriage 80 with respect to the transverse direction, such as the height direction of the device 1. The column assembly 90 generally includes a first component 91 that is configured to remain stationary relative to the extension carriage 80 and the support frame 12 during the extension process. In contrast, the second component 92 is configured to translate (slide) relative to the first component 91 with respect to the transverse direction during the extension process. Accordingly, a longitudinal length of the column assembly 90 is adjustable during use of the extension system 11. As explained above, the extension process includes the extension carriage 80 affixed in position relative to the support frame 12, hence the support frame 12, the extension carriage 80, and the first component 91 all remain substantially stationary during the extension process while the second component 92 translates relative to each of the listed stationary components. As explained hereinafter, the expansion pad assembly 100 is mounted to also be stationary relative to the translatable second component 92 during the extension process, hence the expansion pad assembly 100 is configured to translate in unison with the second component 92 during operation of the extension system 11.

In the present example, the first component 91 is formed by an inner tube 91 and the second component 92 is formed by an outer tube 92 slidably received over the inner tube 91. However, it should be apparent that alternative sliding or translating connections may be utilized while remaining within the scope of the present invention, so long as the second component 92 is slidable relative to the stationary first component 91. For example, the first component 91 may resemble one of the described rail structures 25, 28 while the second component 92 may resemble one of the described slidable carriages 41, 80, as one non-limiting example.

As best shown in FIGS. 11 and 13, although the first component 91 is described as remaining stationary relative to the extension carriage 80 and the support frame 12 during the extension process, the extension carriage 80 and/or the first component 91 may further include a toggle mechanism 87 for adjusting a position of the column assembly 90 relative to the extension carriage 80 and the support frame 12 when the extension system 11 is not in use. The toggle mechanism 87 may be provided as an intervening rotatable or translatable connection between the extension carriage 80 and the first component 91, for example. In some embodiments, the toggle mechanism 87 may be configured to rotate the column assembly 90 and the associated extension pad assembly 100 coupled thereto about an axis arranged in the transverse direction to remove the extension pad assembly 100 from potential interference with the user during an associated knee flexion process. For example, FIG. 11 shows the toggle mechanism 87 as being capable of both rotating the column assembly 90 about an axis extending in the transverse direction (height direction) as well as translating the column assembly 90 perpendicular to the transverse direction (height direction) to an alternative position relative to the extension carriage 80. A locking mechanism 88 may be utilized to affix the position of the column assembly 90 relative to the extension carriage 80 either during use of the extension system 11 or when it is desired to lock the alternative position of the column assembly 90 when not in use.

As another example, FIG. 13 shows an embodiment of the toggle mechanism 87 allowing for the column assembly 90 to be readjusted from extending in the transverse direction (height direction) to extending in the longitudinal direction thereof by rotating the column assembly 90 about a laterally extending axis. The locking mechanism 88 may in turn be received through aligned openings formed in each of the first component 91 and the extension carriage 80 for locking the rotational position of the column assembly 90 at the desired orientation about the laterally extending axis. The embodiment shown in FIG. 13 also may include the ability to incline the column assembly 90 at a slight angle relative to the height direction of the device 1 by including one of the aligned opening pairs at a slight offset relative to the height direction, thereby establishing the described transverse direction at this slight angle relative to the height direction. Such a slight rotational offset may be suitable for configuring the extension system 11 to certain users of the device 1 having specific anatomical features requiring the adjustment of the extension system 11 in the manner described.

As best shown in FIG. 10, the extension pad assembly 100 includes an adjustable clamping sleeve 101, a clamping fastener 104, a swivel shaft 106, a pivoting bar 108, a first extension pad 112, and a second extension pad 116. The clamping sleeve 101 is configured to adjust a position of the extension pad assembly 100 relative to the longitudinal direction of the outer tube 92, which is generally arranged in the transverse direction (height direction) during the extension process. The adjustable nature of the clamping sleeve 101 allows for the extension system 11 to be adjustable to different leg heights and knee positions depending on the anatomical differences between various users of the device 1.

The clamping sleeve 101 wraps around the outer tube 92 with a gap present between two opposing segments 102 thereof. An opening (not shown) is formed in each of the opposing segments 102 with the pair of the openings axially aligned with each other. At least one of the openings includes an internally threaded portion. The clamping fastener 104 is a threaded rod configured for engaging the threaded portion of the at least one of the openings in a manner reducing the gap present between the opposing segments 102, thereby closing the clamping sleeve 101 around the outer tube 92. The frictional forces formed by the clamping force prevent a sliding of the extension pad assembly 100 relative to the outer tube 92 during the extension process of the device 1. The clamping fastener 104 may be loosened to readjust the position of the clamping sleeve 101 before retightening the clamping fastener 104 to again affix the position of the clamping sleeve 101 and the remainder of the extension pad assembly 100. The clamping sleeve 101 may be formed from a material having a relatively high frictional force relative to the outer tube 92. For example, the outer tube 92 may be formed from aluminum and the clamping sleeve 101 may be formed from an elastomeric material.

The clamping sleeve 101 and the clamping fastener 104 accordingly form a positioning locking feature for locking a position of the extension pad assembly 100 relative to the longitudinal direction of the column assembly 90 which corresponds to the previously described transverse direction. However, alternative positioning locking features may also be utilized for selectively adjusting and locking the position of the extension pad assembly 100 relative to the longitudinal direction of the second tube 92, including the use of any suitable locking device or method. For example, such a position locking feature may include a pin configured for entry through aligned openings formed through a component corresponding to the clamping sleeve 101 as well as the outer tube 92, as one non-limiting example.

The swivel shaft 106 projects outwardly from a surface of the clamping sleeve 101 facing towards the beam 13 and provides a laterally extending axis of rotation for the swivel bar 108 to swivel about during the extension process. The swivel bar 108 is arranged perpendicular to the laterally extending axis of rotation and includes a first leg 109 and a second leg 110 that extend equal distances away from the swivel shaft 106. A distal end of the first leg 109 spaced from the swivel shaft 106 includes the first extension pad 112 and a distal end of the second leg 110 oppositely spaced from the swivel shaft 106 includes the second extension pad 116. Each of the extension pads 112, 116 is generally cylindrical in shape and extends axially in parallel to the axis of rotation formed by the swivel shaft 106 when the extension system 11 is in the operational configuration. Each of the extension pads 112, 116 may be received over a corresponding rod or the like extending perpendicular from the swivel bar 108. Each of the extension pads 112, 116 includes a concave surface 113 extended circumferentially thereabout, wherein the concave surface 113 is curved to correspond to the curvature of the upper surface of the upper and lower legs of the user. The first extension pad 112 is configured for placement on a portion of the thigh of the user immediately adjacent the knee (above the knee) while the second extension pad 116 is configured for placement on a portion of the shin of the user also immediately adjacent the knee (below the knee). The extension pads 112, 116 are preferably formed from a relative soft and compressible material to prevent a localized force on the leg of the user, such as being formed from a cushion-like construction or an elastomeric or foam-like material.

The extension hydraulic actuator 120 is a linear actuator configured to control the position of the outer tube 92 (translatable second component 92) relative to the inner tube 91 (stationary first component 91) during the extension process of the device 1. As explained hereinabove, the locking of the position of the extension pad assembly 100 to the outer tube 92 via the clamping sleeve 101 also results in the extension hydraulic actuator 120 simultaneously adjusting the position of each of the extension pads 112, 116 with respect to the transverse direction of the device 1 during the extension process.

The extension hydraulic actuator 120 includes a piston housing (cylinder) 121 disposed within and arranged parallel to the inner tube 91. The piston housing 121 is rigidly coupled to the inner tube 91. The piston housing 121 extends longitudinally from a first end 122 disposed at or adjacent a first end 93 of the inner tube 91 to a second end 123 disposed at a position spaced from the first end 93 and towards a second end 94 of the inner tube 91. The piston housing 121 slidably receives a piston 124 therein including a piston head 125 extending across a chamber 126 formed within the piston housing 121 and a piston rod 127 extending from the piston head 125 out of the piston housing 121. An end of the piston rod 127 disposed opposite the piston head 125 is rigidly coupled to a cross member 95 extending across an interior of the outer tube 92. The movement of the piston rod 127 is accordingly transferred to the outer tube 92 via the cross member 95 as a sliding motion of the outer tube 92 relative to the inner tube 91.

A first fluid connection 128 is formed at the first end 122 of the piston housing 121 and a second fluid connection 129 is formed at the second end 123 of the piston housing 121. The first fluid connection 128 provides fluid communication with a portion of the chamber 126 disposed to a first side of the piston head 125 while the second fluid connection 129 provides fluid communication with a portion of the chamber 126 disposed to an opposing second side of the piston head 125, wherein the portions of the chamber 126 vary with respect to the position of the piston 124 within the piston housing 121. The fluid is preferably the same hydraulic fluid associated with the flexion hydraulic actuator 60 as explained hereinafter when describing the fluid power system 140.

As is conventional, the introduction of a greater fluid pressure to a side of the piston head 125 associated with the first fluid connection 128 causes the piston rod 127 and the associated outer tube 92 to slide in a direction towards the second end 94 of the inner tube 91 while the introduction of the greater fluid pressure to a side of the piston head 125 associated with the second fluid connection 128 causes the piston rod 127 and the outer tube 92 to slide in a direction towards the first end 93 of the inner tube 91. The piston head 125 is accordingly adjustable between a first position adjacent the first end 122 of the piston housing 121, a second position adjacent the second end 123 of the piston housing 121, and a plurality of intermediate positions between the first and second positions, wherein each of the aforementioned positions is determined based on a pressure differential present between the opposing sides of the piston head 125 in fluid communication with the respective fluid connections 128, 129.

Alternate embodiments of the invention may use a power system 140 that is or includes a hydraulic system, a pneumatic system and/or an electro-mechanical system that may include geared mechanical system and/or a motor. Embodiments using a pneumatic system may use a cylinder and piston driven by pressurized air. Embodiments using an electro-mechanical system may be powered by standard 120V or 240V power supply that powers a motorized force application such as by driving one or more gears configured in a geared mechanical system for transferring force.

Unless noted otherwise, the components described as forming the knee extension system 11 may be made of any suitable rigid materials capable of withstanding the forces applied during the extension process. Examples of suitable materials include, but are not limited to, steel, aluminum, iron, plastic, fiber reinforced carbon, other metals, or various alloys or composites. Each of the described components forming the knee extension system 11 may be made of the same material or combinations of different suitable materials. Each of the connections or couplings formed between the different components forming the knee extension system 11 may be accomplished using any suitable fastening methods such as the use of threaded fasteners, rivets, interlocking slots, tongue and groove connections, welding, brazing, chemical joining, clamps, and other suitable fastening methods, so long as the fastening methods utilized maintain the described structural configurations while withstanding the forces generated during the extension process of the device 1.

Fluid Power System

Referring now to FIGS. 13 and 14, the fluid power system 140 includes a hydraulic pump 142, a hand pump lever 144, and a fluid flow path assembly 150 including a stroke adjustment switch 156 and a mode adjustment switch 160. The fluid flow path assembly 150 further includes various hoses or the like for communicating the hydraulic fluid between the hydraulic pump 142, the switches 156, 160, and each of the previously described fluid connections 68, 69, 128, 129 associated with the hydraulic actuators 60, 120 depending on the selected position of each of the switches 156, 160.

The hydraulic pump 142 is configured such that a reciprocating pivoting of the hand pump lever 144 by the user causes a pumping action to the hydraulic pump 142, which converts the mechanical energy of the user operating the hand pump lever 144 to the hydraulic energy generated by the hydraulic pump 142. The hand pump lever 144 may be configured to pivot around a vertically arranged axis at an end of the hand pump lever 144 with a handle of the hand pump lever 144 reciprocating towards and away from a lateral side of the chair 2. However, alternative axes and orientations of the hand pump lever 144 may be utilized without departing from the scope of the present invention. The hydraulic pump 142, the hand pump lever 144, and the switches 156, 160 are shown in FIG. 13 as being mounted to a connecting structure 170 that is in turn mounted to the support frame 12, but the components of the fluid power system 140 may alternatively be coupled directly to the chair 2 or to any portion of the support frame 12 without altering the method of operation of the fluid power system 140, so long as the necessary hoses or conduits properly communicate the hydraulic fluid to the desired portions of the hydraulic actuators 60, 120 in accordance with the user selected modes of operation.

This hydraulic energy is conveyed through the fluid flow path assembly 150 for selective communication with each of the fluid connections 68, 69, 128, 129 to cause each of the pistons 64, 124 to move in a desired direction as explained hereinabove. The hydraulic pump 142 and the hand pump lever 144 may each be in fluid communication with a fluid reservoir for storing the hydraulic fluid therein.

The fluid flow path assembly 150 may include the stroke adjustment switch 156 disposed immediately adjacent the hydraulic pump 142 with two different hoses branching from the stroke adjustment switch 156. Each of the two hoses lead to the mode adjustment switch 160. Four different hoses may then extend from the mode adjustment switch 160 with two of the hoses associated with the flexion hydraulic actuator 60 and the other two of the hoses associated with the extension hydraulic actuator 120. A first of the two hoses associated with the flexion hydraulic actuator 60 may lead to the first fluid connection 68 thereof while a second of the two hoses may lead to the second fluid connection 69 thereof. Similarly, a first of the two hoses associated with the extension hydraulic actuator 120 may lead to the first fluid connection 128 thereof while a second of the two hoses may lead to the second fluid connection 129. The hoses extending to the extension hydraulic actuator 120 may be fed through an interior of the inner tube 91.

The stroke adjustment switch 156 is configured to be toggled between at least a first position and a second position, wherein the different positions are associated with which of the two hoses extending from the stroke adjustment switch 156 receives the pressurized hydraulic fluid from the hydraulic pump 142 as the result of the pumping action of the hand pump lever 144. For example, the first position may correspond to a push position wherein each of the pistons 64, 124 is moved in a direction towards the corresponding piston rod 67, 127 thereof and the second position may correspond to a pull position wherein each of the pistons 64, 124 is moved in a direction away from the corresponding piston rod 67, 127, depending on the selected mode of operation of the device 1 as discussed below. This configuration is shown in the schematic of FIG. 14.

As another example, the first position may be considered an active position for causing the corresponding flexion/extension process to be carried out in a manner straining the knee joint (a movement for a bending of the knee in the case of the flexion process and a movement for a straightening of the knee in the case of the extension process) while the second position may be considered an inactive position for releasing the strain on the knee joint in an opposing direction relative to the active position. The stroke adjustment switch 156 may further include a third position (not shown) wherein both of the hydraulic actuators 60, 120 are temporarily removed from fluid communication with the hydraulic pump 142, as desired.

The mode adjustment switch 160 is configured to toggle between a first position and a second position, wherein the different positions are associated with which of the hydraulic actuators 60, 120 is instantaneously placed in fluid communication with the remainder of the fluid power system 140. For example, the first position may correspond to the hydraulic fluid communicating with the flexion hydraulic actuator 60 while the second position may corresponding to the hydraulic fluid communicating with the extension hydraulic actuator 60. The mode adjustment switch 160 may further include a third position for preventing fluid communication with either of the hydraulic actuators 60, 120. As shown in FIG. 14, the mode adjustment switch 160 may be provided as a pair of three-way diverting valves with one of the valves in communication with each of the first fluid connections 68, 128 and the other of the valves in communication with each of the second fluid connections 69, 129.

The fluid power system 140 shown in FIG. 14 may be varied so long as the same relationships are maintained regarding the ability of the single fluid power system 140 to control each of the flexion system 10 and the extension system 11 interchangeably. For example, the positions of the stroke adjustment switch 156 and the mode adjustment switch 160 may be reversed so long as the hydraulic fluid is delivered to the fluid connections 68, 69, 128, 129 in the manner desired for performing the flexion and/or extension processes as described.

Additionally, although the fluid power system 140 is explained as utilizing a hydraulic fluid for powering each of the actuators 60, 120, it should be apparent that other fluids may be utilized in a similar manner, such as utilizing pneumatic actuators utilizing pressurized air for powering each of the actuators 60, 120.

Operation of the Flexion Process

The flexion process of the device 1 utilizing the flexion system 10 may occur as follows. The ankle support structure 58 is pivoted to the second position so as not to obstruct the use of the foot plate 48. Based on the illustrated configuration of the device 1, the user sits on the seat 3 of the chair 2 with the leg of the user extended to place the foot of the user on the outwardly facing surface of the foot plate 48 with a heel of the user resting on the heel support 51. An initial position of the foot support carriage 41 may be established by toggling the mode adjustment switch 160 to a position corresponding to the hydraulic fluid communicating with the fluid connections 68, 69 associated with the flexion hydraulic actuator 60. The stroke adjustment switch 156 may be toggled between the active position (moving the foot support carriage 41 towards the chair 2) and the inactive position (moving the foot support carriage 41 away from the chair 2) and the hand pump lever 144 may be actuated any number of times to power the hydraulic pump 142, wherein the pressurization of the hydraulic fluid is communicated to the desired one of the fluid connections 68, 69 for moving the piston 64 and the piston rod 67 in the desired direction. Each actuation of the hand pump lever 144 causes the foot support carriage 41 to slide relative to the longitudinal direction of the frame support 12 with respect to the selected position of the stroke adjustment switch 156 to place the foot support carriage 41 at the desired initial position corresponding to a length of the leg of the user.

Once initially configured for the user, the stroke adjustment switch 156 is toggled to the active position to cause the foot support carriage 41 and the adjoining foot plate 48 to move towards the chair 2 with each successive reciprocating actuation of the hand pump lever 144. The user repeatedly actuates the hand pump lever 144 to cause the foot support carriage 41 to incrementally move towards the chair 2 in a manner causing a flexion of the knee joint. The foot plate 48 may also pivot relative to the upstanding member 43 to accommodate the changing configuration of the leg of the user. The position of the foot support carriage 41 may be moved until the foot support carriage 41 reaches a desired marking on the position indicator 37 corresponding to the maximum desired flexion of the knee joint for the instantaneous repetition.

Once the repetition is complete, the stroke adjustment switch 156 may be toggled to the inactive position for causing each actuation of the hand pump lever 144 to move the foot support carriage 41 away from the chair 2 to progressively straighten the leg of the user. Alternatively, when in the inactive position, the user may apply pressure to the foot plate 48 to manually slide the foot support carriage 41 away from the chair 2. The flexion system 10 is then ready for a subsequent repetition, as needed.

In various embodiments, the flexion functionality of the invention may be operated by a user submitting input to the system such as by pressing a button to actuate a motor or pumping a lever to actuate a mechanical system.

Operation of the Extension Process

The extension process of the device 1 utilizing the extension system 11 may occur as follows. The ankle support structure 58 is rotated to the aforementioned first position with the ankle support structure 58 resting on the foot plate 48 as shown in FIG. 13. One of the pads 47 may be disposed on the ankle support structure 58 to provide further comfort to the user and to avoid contamination of the foot plate 48 and/or the ankle support structure 58. A concave and upwardly facing surface of the pad 47 and/or the ankle support structure 58 receives the ankle of the user therein with the leg arranged as straight as is allowable with respect to the user when the user is seated in the chair 2. As described above with reference to the operation of the flexion process, the foot support carriage 41 may need to be initially positioned to locate the ankle of the user at the desired distance from the chair 2 based on the anatomical configuration of the user, wherein the initial positioning may be accomplished using the fluid power system 140 with the mode adjustment switch 160 placing the hydraulic pump 142 in fluid communication with the flexion hydraulic actuator 60.

Once the foot support carriage 41 is properly positioned relative to the chair 2, the extension system 11 may be in need of adjustment with respect to the longitudinal direction of the support frame 12 to place the extension pad assembly 100 at a desired position relative to the knee joint of the user. The clamping mechanism 83 may be loosened to slide the extension carriage 80 relative to the second rail structure 28 to the desired position before then tightening the clamping mechanism 83 to apply the described clamping force. The position of the extension carriage 80 is adjusted until the first extension pad 112 is disposed for engagement with the thigh of the user above the knee joint while the second extension pad 116 is disposed for engagement with the shin of the user below the knee joint.

The extension pad assembly 100 may require further adjustment in the transverse direction to accommodate the anatomy of the instantaneous user, wherein the extension pads 112, 116 are positioned immediately adjacent the knee joint prior to the extension process. The clamping sleeve 101 may be loosened via the clamping fastener 104 to slide the clamping sleeve 101 and the remainder of the extension assembly 100 along the outer tube 92 to the desired position before tightening the clamping fastener 104 to affix the position of the clamping sleeve 101 such that the clamping sleeve 101 moves in unison with the outer tube 92 during the extension process.

Once the extension system 11 is adjusted accordingly to accommodate the instantaneous user thereof, the mode adjustment switch 160 may be toggled to the extension mode of operation for communicating the pressurized hydraulic fluid to the extension hydraulic actuator 120 and the stroke adjustment switch 156 may be moved to the active position corresponding to the outer tube 92 and the adjoining extension pad assembly 100 moving downwardly towards the knee joint of the user. The user then actuates the hand pump lever 144 to cause the extension pad assembly 100 to incrementally move towards the knee joint until each of the extension pads 112, 116 engages the described positions for causing the extension pads 112, 116 to straddle the knee joint. The user then repeatedly actuates the hand pump lever 144 to cause the extension pad assembly 100 to apply a downward force to the leg for extending the knee joint. The manner in which the extension pads 112, 116 are capable of swiveling about the axis of rotation of the swivel bar 108 as formed by the swivel shaft 106 beneficially allows for a force applied to each side of the knee joint to be substantially equally distributed through the different configurations of the knee joint despite the changing angle present between the thigh and the shin of the user. This process is illustrated by comparison of FIGS. 15 and 16.

Once the knee joint has been extended to the desired degree, the stroke adjustment switch 156 may be toggled to the inactive position for causing each actuation of the hand pump lever 144 to move the extension pad assembly 100 away from the knee joint. Alternatively, the toggling to the inactive position may allow for the user to flex the knee joint to manually move the extension pad assembly 100 away from the extended position.

In various embodiments, the extension functionality of the invention may be operated by a user submitting input to the system such as by pressing a button to actuate a motor or pumping a lever to actuate a mechanical system.

The disclosed device 1 provides numerous advantages. The use of a single fluid power system 140 allows for both processes to be controlled using a sufficiently strong hydraulic power source that can be incrementally actuated in a manner conducive to the improvement of the range of motion of the knee joint with respect to both flexion and extension. The ability to switch the mode of operation via the adjustment of switches 156, 160 also simplifies the use of the device 1 when changing between the different processes. The use of the same device 1 for both described processes further eliminates the need for space for two independent devices both during use and during storage. The combination of the two processes into the same device also lowers cost by allowing for certain components to be adapted for both processes, such as the chair 2, the frame support 12 having the dual rail structures 25, 28, and the foot support assembly 40 having the adjustable ankle support structure 58, while also eliminating the need for an independent purchase of each associated device.

The force feedback (or tactile sense of resistance) in the system can be felt by the user in a hydraulic system (i.e. the user feels that it is harder to pump the lever when there is more resistance due to a stiff knee or at the end of the range of motion). Other methods of simulating this feedback could be achieved in a mechanical system, hydraulic system, or via a motor (i.e. the motor can be programmed to move slower/faster based on measured torque). For example, in various embodiments of the invention, force feedback is provided to the user through touch, such as by resistance when the user is actuating either or both of the extension and flexion functionalities. For example, the system may provide force feedback to the user via a lever-driven input mechanism when the patient's anatomy is resisting the extension or flexion movements. Such force feedback through the user's input mechanism is important to avoid injury and ensure achievement of appropriate levels of high-intensity stretch while minimizing risk. In electro-mechanical driven systems that are part of alternate embodiments of the invention, the user may receive force feedback by varying levels of vibration of a button or other input device, varying levels of audible alerts, varying levels of visual alerts, or some combination of the same.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A device for manipulating a leg of a user, the device configured to perform either of a flexion process or an extension process with respect to a knee joint of the user, the device comprising:

- a support frame extending in a longitudinal direction from a first end to a second end;
- a flexion system comprising:
  - a foot support assembly configured to translate relative to the support frame in the longitudinal direction thereof, the foot support assembly configured to engage a foot of the user during a flexion process of the device or an ankle of the user during an extension process of the device; and
  - a flexion linear actuator configured to selectively cause the translation of the foot support assembly with respect to the longitudinal direction of the support frame during the flexion process;
- an extension system comprising:
  - a column assembly extending from the support frame in a transverse direction arranged transverse to the longitudinal direction thereof, the column assembly including a first component coupled to the support frame and a second component configured to translate relative to the first component with respect to the transverse direction;
  - an extension pad assembly coupled to the second component of the column assembly, the extension pad assembly including a first extension pad configured to engage an upper surface of the leg at a position above the knee joint and a second extension pad configured to engage the upper surface of the leg at a position below the knee joint during the extension process of the device; and an extension linear actuator configured to selectively cause the translation of the second component having the extension pad assembly with respect to the transverse direction during the extension process; and a power system configured to selectively actuate each of the flexion linear actuator and the extension linear actuator.

2. The device according to claim 1, wherein the power system comprises an electro-mechanical system comprising at least one motor.

3. The device according to claim 1, wherein the power system comprises a geared mechanical system.

4. The device according to claim 1, wherein the first end of the support frame is mounted to a seating structure and the second end of the support frame rests on a floor surface.

5. The device according to claim 1, wherein the support frame includes a position indicator extending in the longitudinal direction of the support frame.

6. The device according to claim 1, wherein the support frame includes a rail structure configured to slidably engage a foot support carriage of the foot support assembly.

7. The device according to claim 1, wherein the extension system is configured to translate relative to the support frame with respect to the longitudinal direction thereof to position the extension pad assembly adjacent the knee joint.

8. The device according to claim 1, wherein the foot support assembly includes a foot support carriage slidably coupled to the support frame and a foot plate rotatably coupled to the foot support carriage.

9. The device according to claim 1, wherein the flexion linear actuator is a hydraulic cylinder powered by a hydraulic fluid.

10. The device according to claim 1, wherein the extension linear actuator is a hydraulic cylinder powered by a hydraulic fluid.

11. The device according to claim 1, wherein the extension pad assembly includes a swivel bar having the first and second extension pads coupled to opposing ends thereof.

12. The device according to claim 1, wherein each of the first extension pad and the second extension pad includes a circumferentially extending concave surface.

13. The device according to claim 1, wherein the extension pad assembly includes a position locking feature for locking a position of the extension pad assembly to the second component with respect to the transverse direction.

14. The device according to claim 1, wherein the first component is an inner tube and the second component is an outer tube, the outer tube telescoping relative to the inner tube.

15. The device according to claim 1, wherein a toggle mechanism is configured to change a position of the extension system relative to the support frame during the flexion process or storage of the device.

16. A device for manipulating a leg of a user, the device configured to perform either of a flexion process or an extension process with respect to a knee joint of the user, the device comprising:

a support frame including a beam, a mounting assembly at a first end configured for removable coupling to a seating structure, and a support member at a second end configured to rest on a floor surface, wherein the beam extends in a longitudinal direction from the first end to the second end and includes a rail structure for slidably engaging a foot support carriage;

a flexion system for carrying out the flexion process, the flexion system including a foot support assembly configured to translate the support frame in the longitudinal direction thereof, and a flexion linear actuator configured to selectively actuate in a first direction and a second direction to cause the translation of the foot support assembly;

an extension system for carrying out the extension process; the extension system including an extension linear actuator configured to selectively actuate in a first direction and a second direction; and a power system including a hydraulic pump and a fluid path assembly configured to selectively actuate each of the flexion linear actuator and the extension linear actuator, wherein the fluid flow path assembly includes a mode adjustment switch configured to toggle between a first position placing the flexion linear actuator in fluid communication with the hydraulic pump and a second position placing the extension linear actuator in fluid communication with the hydraulic pump.

17. The device according to claim 16, wherein each of the flexion linear actuator and the extension linear actuator is a hydraulic cylinder, and wherein a common hydraulic fluid of the power system is configured to be selectively communicated to each of the flexion linear actuator and the extension linear actuator.

18. The device according to claim 16, wherein the power system is powered by a hand pump lever actuated by the user.

19. A device for manipulating a leg of a user, the device configured to perform an extension process with respect to a knee joint of the user, the device comprising:

a column assembly including a stationary first component comprising an inner tube and a second component comprising an outer tube telescoping relative to the inner tube, the second component configured to translate relative to the first component with respect to a longitudinal direction of the column assembly;

an extension pad assembly coupled to the second component of the column assembly, the extension pad assembly including a first extension pad configured to engage an upper surface of the leg at a position above the knee joint and a second extension pad configured to engage the upper surface of the leg at a position below the knee joint during the extension process of the device, wherein the extension pad assembly includes a swivel bar having the first and second extension pads coupled to opposing ends thereof, wherein the swivel bar rotates about an axis of rotation arranged perpendicular to the longitudinal direction of the column assembly, and wherein each of the first extension pad and the second extension pad includes a circumferentially extending concave surface; and an extension linear actuator configured to selectively cause the translation of the second component having the extension pad assembly with respect to the longitudinal direction of the column assembly during the extension process;

a support frame extending in a longitudinal direction, the support frame including a rail structure and an extension carriage slidably coupled to the rail structure for translation of the column assembly relative to the support frame with respect to the longitudinal direction thereof to position the extension pad assembly adjacent the knee joint of the user.

20. The device according to claim 19, wherein the column assembly is configured to be translatable relative to a direction of extension of the leg of the user during the extension process.

21. The device according to claim 19, wherein the extension pad assembly includes a position locking feature for locking a position of the extension pad assembly to the second component with respect to the longitudinal direction of the column assembly.

* * * * *